United States Patent
Suetsugu et al.

(10) Patent No.: US 11,731,581 B2
(45) Date of Patent: Aug. 22, 2023

(54) HOOD RETRACTION STRUCTURE

(71) Applicant: HONDA MOTOR CO., LTD., Tokyo (JP)

(72) Inventors: Chisato Suetsugu, Saitama (JP); Kazutada Sasaki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/678,015

(22) Filed: Feb. 23, 2022

(65) Prior Publication Data

US 2022/0314924 A1    Oct. 6, 2022

(30) Foreign Application Priority Data

Mar. 31, 2021   (CN) .......................... 202110343180.3

(51) Int. Cl.
*B60R 21/38* (2011.01)
*B62D 25/12* (2006.01)
*E05B 83/24* (2014.01)

(52) U.S. Cl.
CPC .............. *B60R 21/38* (2013.01); *B62D 25/12* (2013.01); *E05B 83/24* (2013.01); *E05Y 2900/536* (2013.01)

(58) Field of Classification Search
CPC ......... B60R 21/38; B62D 25/12; E05B 83/24; E05B 77/08; E05Y 2900/536
See application file for complete search history.

(56) References Cited

U.S. PATENT DOCUMENTS

| | | | |
|---|---|---|---|
| 9,573,560 B1* | 2/2017 | Narita | ..................... B60R 21/26 |
| 2019/0232915 A1* | 8/2019 | Szente | ................. B62D 25/105 |

FOREIGN PATENT DOCUMENTS

| | | | | |
|---|---|---|---|---|
| DE | 102014219758 A1 * | 9/2015 | ............. | B60R 21/38 |
| FR | 2926272 A1 * | 7/2009 | ............. | B60R 21/38 |
| JP | 4986724 B2 | 7/2012 | | |

OTHER PUBLICATIONS

Fichtinger, DE-102014219758-A1 (Year: 2015).*
Groeninck, FR-2926272-A1 (Year: 2009).*

* cited by examiner

*Primary Examiner* — Jason D Shanske
*Assistant Examiner* — Matthew James O'Neill
(74) *Attorney, Agent, or Firm* — CKC & Partners Co., LLC

(57) ABSTRACT

Technology is provided which allows the amount of a hood protruding forward from a striker to be reduced at a normal time before the pop-up hood system is operated, and allowing the stroke when the front end of the hood rotates downward when the pop-up hood system is operated to be reduced, such that it is possible to effectively utilize the space. A hood retraction structure includes: a slider provided at a front side lower portion of a hood; and a rail that is provided on an upper portion of a striker body constituting a hood locking mechanism, movable in a longitudinal direction relative to the slider, and is longer than the slider in a length in the longitudinal direction. Retraction of the slider relative to the rail allows the hood to retract relative to the hood locking mechanism.

18 Claims, 16 Drawing Sheets

HOOD RETRACTION STRUCTURE

This application is based on and claims the benefit of priority from Chinese Patent Application No. CN202110343180.3, filed on 31 Mar. 2021, the content of which is incorporated herein by reference.

BACKGROUND OF THE INVENTION

Field of the Invention

The present invention relates to a hood retraction structure.

Related Art

A pop-up hood system has been known conventionally which, in the event of a collision between a vehicle and a target to be protected such as pedestrian, reduces the impact to the target by popping up and raising the rear end side of the hood to receive the target. When the pop-up hood system detects a collision with a target to be protected by a collision detection sensor such as a camera, the system pops up and raises the rear end side of the hood to provide added clearance between the engine compartment and the hood such that the impact in the event of the collision between the vehicle body and the target to be protected is reduced.

Incidentally, from the viewpoint of maintenance of components such as an engine, the hood generally includes a front-opening structure which opens the front end side upward with the hinge portion provided on the rear end side of the hood as a rotation center. Furthermore, the hood includes a locking structure by engaging the striker provided on the lower surface of the front end side to the latch provided on the vehicle body side when closing the hood.

Therefore, when the pop-up hood system operates and the rear end side rises, the hood needs to have a structure capable of moving on a trajectory of retracting and raising the rear end side while retracting without releasing the lock. In this respect, a structure has been proposed which includes a striker in which a slide portion having the upper ends of a front shaft portion and a rear shaft portion, each extending in the vertical direction, is connected in a manner movable relative to the guide portion provided on the lower surface of the front end of the hood and extending in the longitudinal direction (for example, refer to Japanese Patent No. 4986724). According to this structure, when the pop-up hood system is operated, the guide portion retracts relative to the slide portion, thereby allowing the hood to retract.
Patent Document 1: Japanese Patent No. 4986724

SUMMARY OF THE INVENTION

However, in the structure of Japanese Patent No. 4986724, since the guide portion provided on the hood side is long extending in the longitudinal direction, while the slide portion of the striker has an axial structure that extends in the vertical direction and is short in the longitudinal direction, the hood is in a state protruding forward when the pop-up hood system is normal before actuation. Therefore, in the structure of Patent Document 1, the space in the front region of the striker is not effectively utilized, and when the front end side of the hood rotates downward when the pop-up hood system is operated, the required stroke at that time is also large, so that more space is required.

The present invention has been made in view of the above, and an exemplary embodiment of the present invention provides a technology that allows the amount of a hood protruding forward from a striker to be reduced at a normal time before the pop-up hood system is operated, and allows the stroke when the front end of the hood rotates downward when the pop-up hood system is operated to be reduced, such that it is possible to effectively utilize the space.

According to a first aspect of the present invention, a hood retraction structure (for example, a hood retraction structure 7 to be described later) is provided which allows a hood (for example, a hood 8 to be described later) to retract relative to a hood locking mechanism (for example, a hood locking mechanism 6 to be described later) when a pop-up hood system (for example, a pop-up hood system 9 to be described later) operates, and the hood retraction structure includes: a slider (for example, a slider 1 to be described later) provided at a front side lower portion (for example, a front side lower portion 80 to be described later) of the hood; and a rail (for example, a rail 2 to be described later) that is provided on an upper portion (for example, an upper portion 31 of the striker body to be described later) of a striker body (for example, a striker body 3 to be described later) constituting the hood locking mechanism, is movable in a longitudinal direction relative to the slider, and is longer than the slider in a length in the longitudinal direction. A retraction of the slider relative to the rail allows the hood to retract relative to the hood locking mechanism.

According to a second aspect of the present invention, in the hood retraction structure of the first aspect, before the pop-up hood system operates, the slider may be positioned on a front end side of the rail, and when the pop-up hood system operates, the slider may move rearward of the rail.

According to a third aspect of the present invention, in the hood retraction structure of the first or second aspect, the slider and the rail may move relative to each other in the longitudinal direction at a pair of slide portions (for example, slide portions 10 to be described later) which are spaced apart from each other in a vehicle width direction, the rail may include a convex portion (for example, a convex portion 21 to be described later) that protrudes downward between the pair of slide portions, and the upper portion of the striker body may be fastened to the convex portion.

According to a fourth aspect of the present invention, in the hood retraction structure of the third aspect, the convex portion may be provided on a rail plate (for example, a rail plate 22 to be described later) provided between the pair of slide portions, and the rail plate may include a rail stepped portion (for example, a rail stepped portion 23 to be described later) provided on each of both sides in a vehicle width direction, the rail stepped portion extending upward to connect to an upper end (for example, an upper end 10*a* of the slide portion to be described later) of each of the pair of slide portions.

According to a fifth aspect of the present invention, in the hood retraction structure in any one of the first to fourth aspects, the rail may include a stopper portion (for example, a stopper portion 25 to be described later) that is provided at a rear portion of the rail and regulates retraction of the slider, and the stopper portion may be continuously provided via a folded portion (for example, a folded portion 24 to be described later) from the rail.

According to a sixth aspect of the present invention, in the hood retraction structure of the fifth aspect, the rail may include a decelerator (for example, a deceleration mechanism to be described later) that is provided at the rear portion of the rail and reduce a retraction speed of the slider.

According to a seventh aspect of the present invention, in the hood retraction structure of any one of the first to sixth aspects, the striker body may be in a substantially U-shape in a side view, and a curvature of an inner surface in a front side corner portion (for example, a front side corner portion 32 of the striker body to be described later) of the striker body may substantially coincide with a curvature of an engagement surface in a latch engagement portion (for example, a latch engagement portion 41 to be described later) that engages the striker body of a latch (for example, a latch 4 to be described later) that is provided in a vicinity of a vehicle body and constitutes the hood locking mechanism.

According to an eighth aspect of the present invention, in the hood retraction structure of any one of the first to seventh aspects, the slider and the rail may be coupled to each other in a manner movable relative to each other such that the hood retracts relative to the hood locking mechanism, and the slider and the rail may include a pair of slide portions respectively provided to be spaced apart from each other in a vehicle width direction, and each provided by engaging folded plate members with each other.

According to a ninth aspect of the present invention, in the hood retraction structure of any one of the first to eighth aspects, the slider and the rail may be provided at a pair of slide portions spaced apart from each other in a vehicle width direction in a manner movable relative to each other in a longitudinal direction, such that the hood retracts relative to the hood locking mechanism, the rail may include a locking portion (for example, a locking portion 26 to be described later) including a cantilevered plate spring which is flexibly deformed in a manner that the rail regulates movement of the slider before the pop-up hood system operates, and the hood retracts when the pop-up hood system operates, the striker body may be provided between the pair of slide portions, and the locking portion may include a pair of locking portions that are provided on both sides in a vehicle width direction across the striker body.

According to a tenth aspect of the present invention, in the hood retraction structure of any one of the first to ninth aspects, the slider may have a notch (for example, a notch 11 to be described later) having an opening end provided by being cut in a concave shape from a vehicle front side toward a vehicle rear side, and the notch constitutes the hood locking mechanism, and is provided at a position corresponding to an upper portion of a secondary lever (for example, a secondary lever 5 to be described later) that regulates upward movement of the striker body, and the rail may include an opening (for example, an opening 27 to be described later) having a closed cross section, and the opening is provided at a position corresponding to an upper portion of the secondary lever.

According to the exemplary embodiments of the present invention, it is possible to allow the amount of a hood protruding forward from a striker to be reduced at a normal time before the pop-up hood system is operated, and allow the stroke when the front end of the hood rotates downward when the pop-up hood system is operated to be reduced, such that it is possible to effectively utilize the space.

DETAILED DESCRIPTION OF THE INVENTION

Hereinafter, embodiments of the present invention will be described in detail with reference to the drawings. In each figure, Fr represents the front of the vehicle, Rr represents the rear of the vehicle, R represents the right direction as seen by the driver, L represents the left direction as seen by the driver, and U represents the upper direction.

Figure 1:
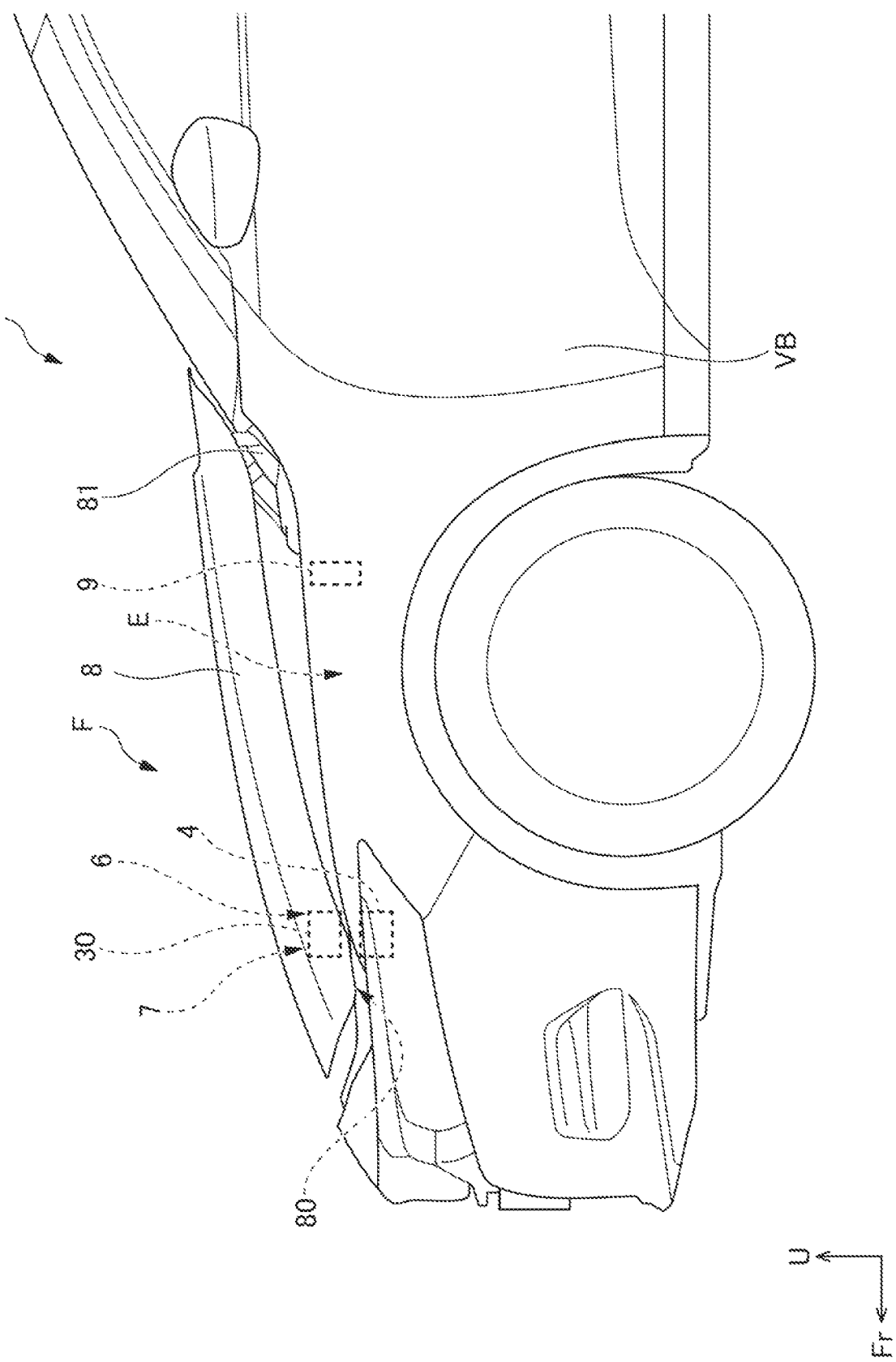
FIG. 1 is a side view of a front portion of a vehicle including a hood retraction structure according to an embodiment of the present invention.

FIG. 1 is a side view of a front portion F of a vehicle V provided with a hood retraction structure 7 according to an exemplary embodiment. FIG. 1 shows a state when a pop-up hood system 9 is operated. As shown in FIG. 1, the vehicle V having the hood retraction structure 7 according to the present embodiment includes a hood 8 that covers an upper surface of an engine compartment E at the front part portion F of a vehicle body VB. The hood 8 includes a hinge portion 81 at the rear end side thereof, and the hood 8 has a front opening structure which opens the front end side upward about the hinge portion 81 as a rotation center. The vehicle V includes a hood locking mechanism 6 that locks the hood 8, and the hood locking mechanism 6 includes a striker 30 provided at a front side lower portion 80 of the hood 8, and a latch 4 that is provided in the vicinity of the vehicle body VB and locks the striker 30.

Furthermore, the vehicle V includes the pop-up hood system 9 which is configured to pop up and raise the rear end side of the hood 8 in the event of the collision between a target to be protected such as pedestrian and the vehicle to receive the target such that it is possible to reduce the impact. The pop-up hood device 9 includes, for example, a front actuator that pops up and raises the front portion of the hood 8, and a rear actuator that pops up and raises the rear portion of the hood 8 (none of them are illustrated). However, the front part actuator may be optional.

Figure 2:
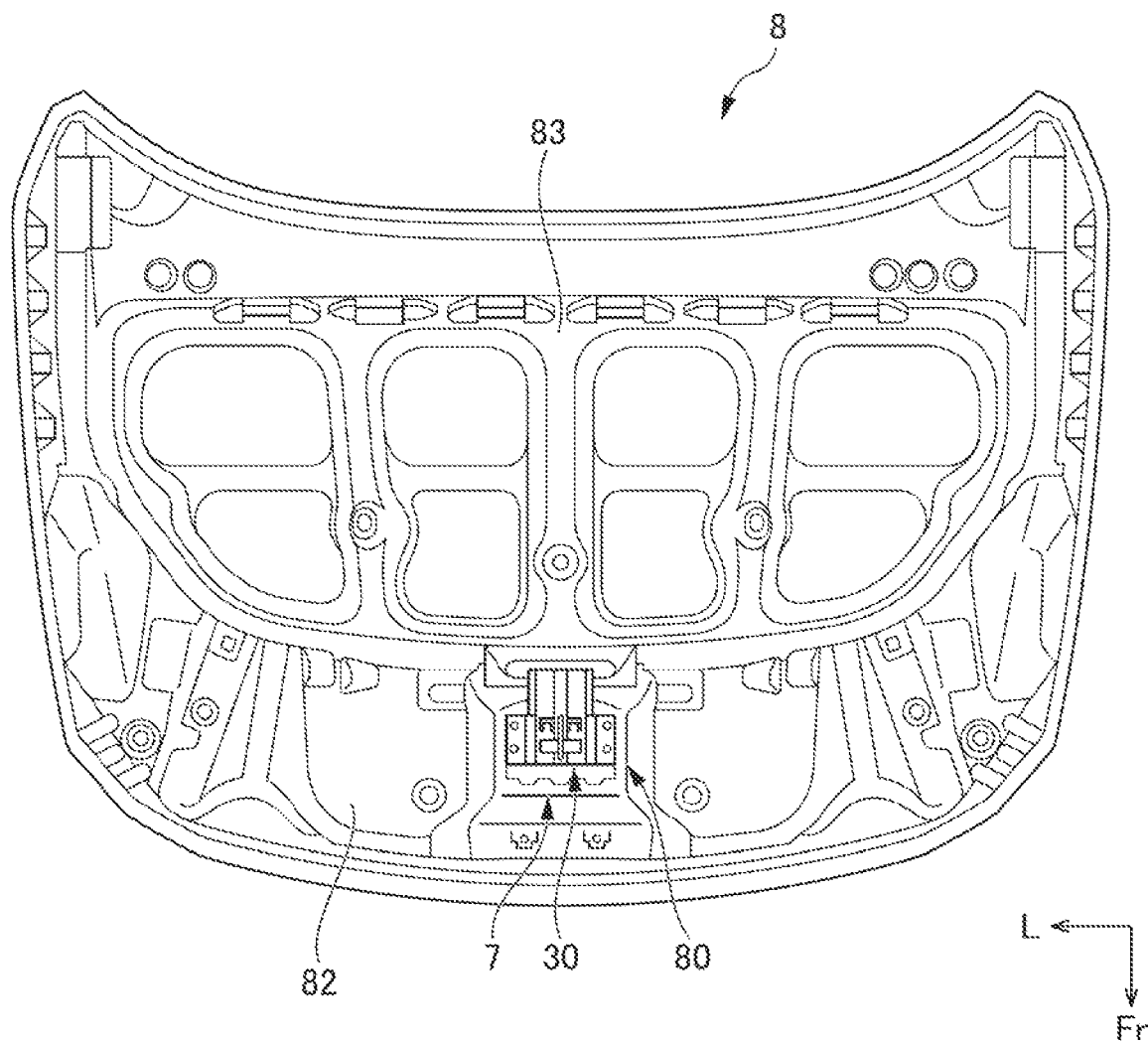
FIG. 2 is a rear view of a hood provided with the hood retraction structure according to the embodiment.
Figure 3:
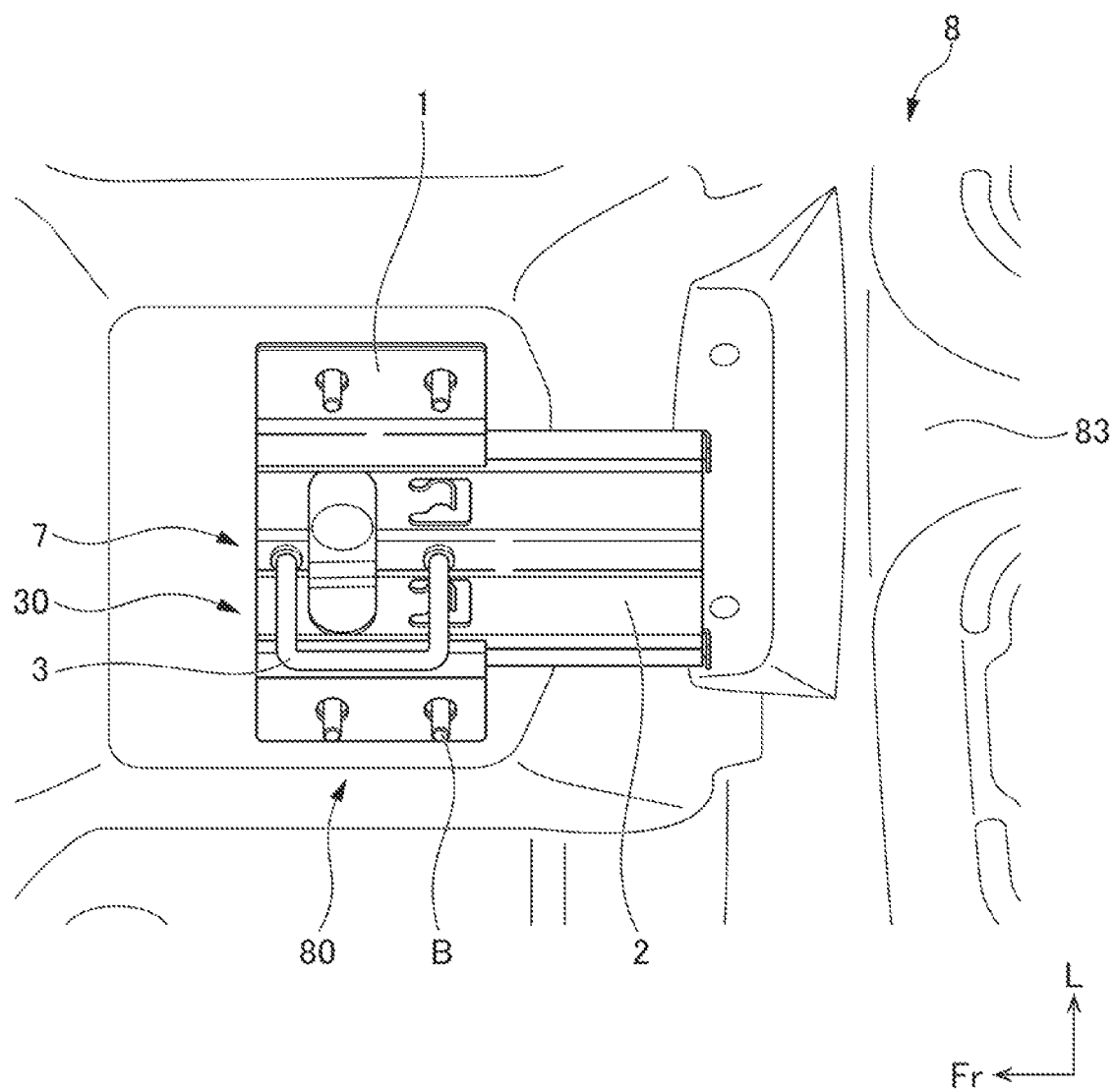
FIG. 3 is a view of the hood retraction structure according to the embodiment as viewed obliquely from below.

FIG. 2 is a rear view of the hood 8 provided with the hood retraction structure 7 according to the present embodiment. FIG. 3 is a view of the hood retraction structure 7 according to the present embodiment as viewed from below obliquely. As shown in FIGS. 2 and 3, the hood retraction structure 7 according to the present embodiment is provided on the rear surface (lower surface) of the hood 8 which includes a plate-shaped hood skin 82 and a hood frame 83 joined to the lower surface of the hood skin 82. More specifically, the hood retraction structure 7 is provided substantially in the middle in the vehicle width direction of the front side lower portion 80 of the hood 8, and a slider 1 to be described later constituting the hood retraction structure 7 is fastened by bolts B to the front side lower portion 80 of the hood 8. It should be noted that the striker 30 engaged with the latch 4 constitutes a portion of the hood retraction structure 7 according to the present embodiment.

Figure 4:
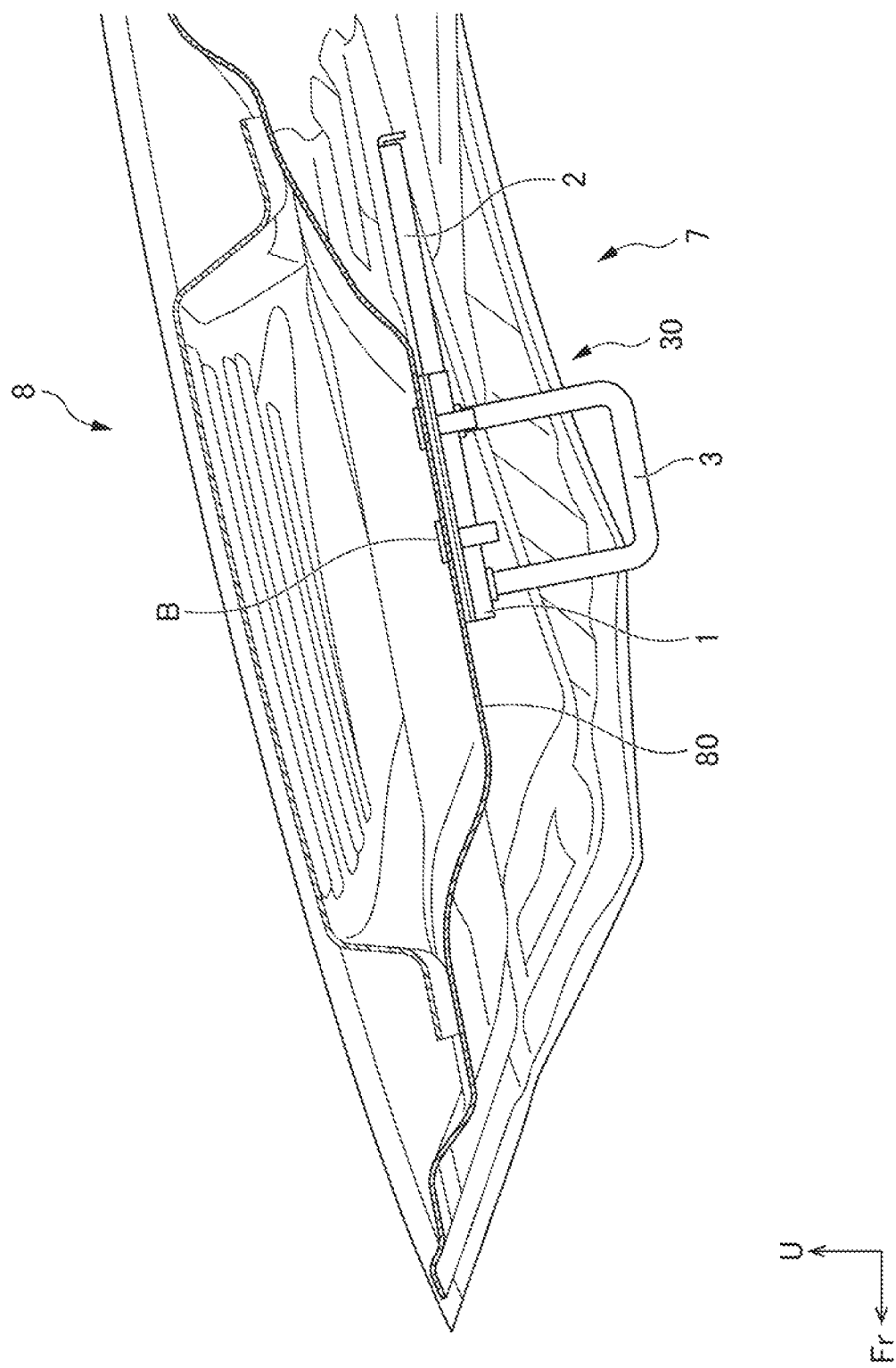
FIG. 4 is a cross-sectional side view of the hood according to the embodiment.

FIG. 4 is a cross-sectional side view of the hood 8 according to the present embodiment. As shown in FIG. 4, the hood retraction structure 7 is provided at the front side lower portion 80 of the hood 8 in a state in which the front of the hood retraction structure 7 is sloped downward in the front direction along the slope of the hood 8. With such a hood retraction structure 7, when the pop-up hood system 9 is operated and the rear end side of the hood 8 is raised, it is possible for the hood 8 to move in the trajectory of tilting forward by raising the rear end side while retracting without releasing the lock by the hood locking mechanism 6.

Next, the hood retraction structure 7 according to the present embodiment will be described in detail with reference to FIGS. 3 to 12. In each figure, for convenience of explanation, the fastening members such as bolts are omitted as appropriate.

Figure 5:
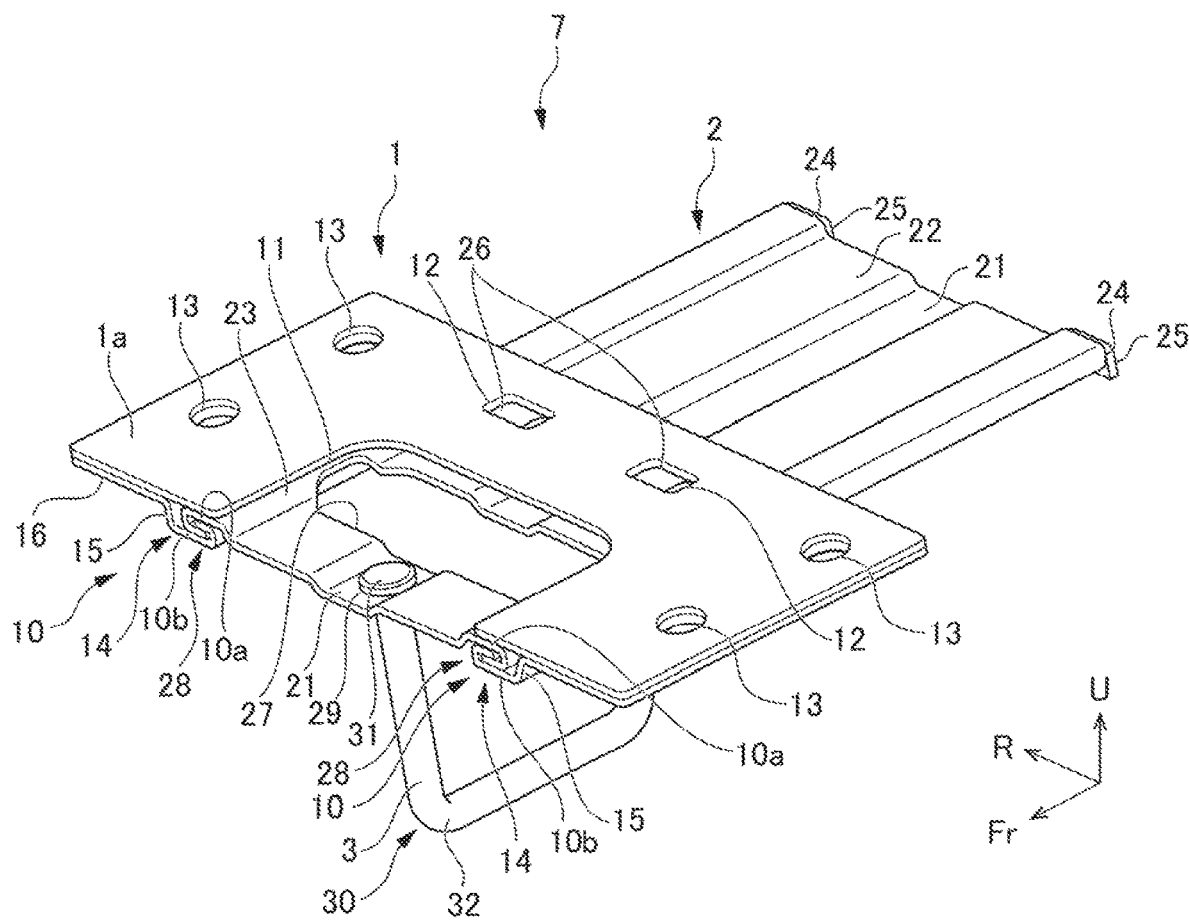
FIG. 5 is a perspective view of the hood retraction structure according to the embodiment.
Figure 6:
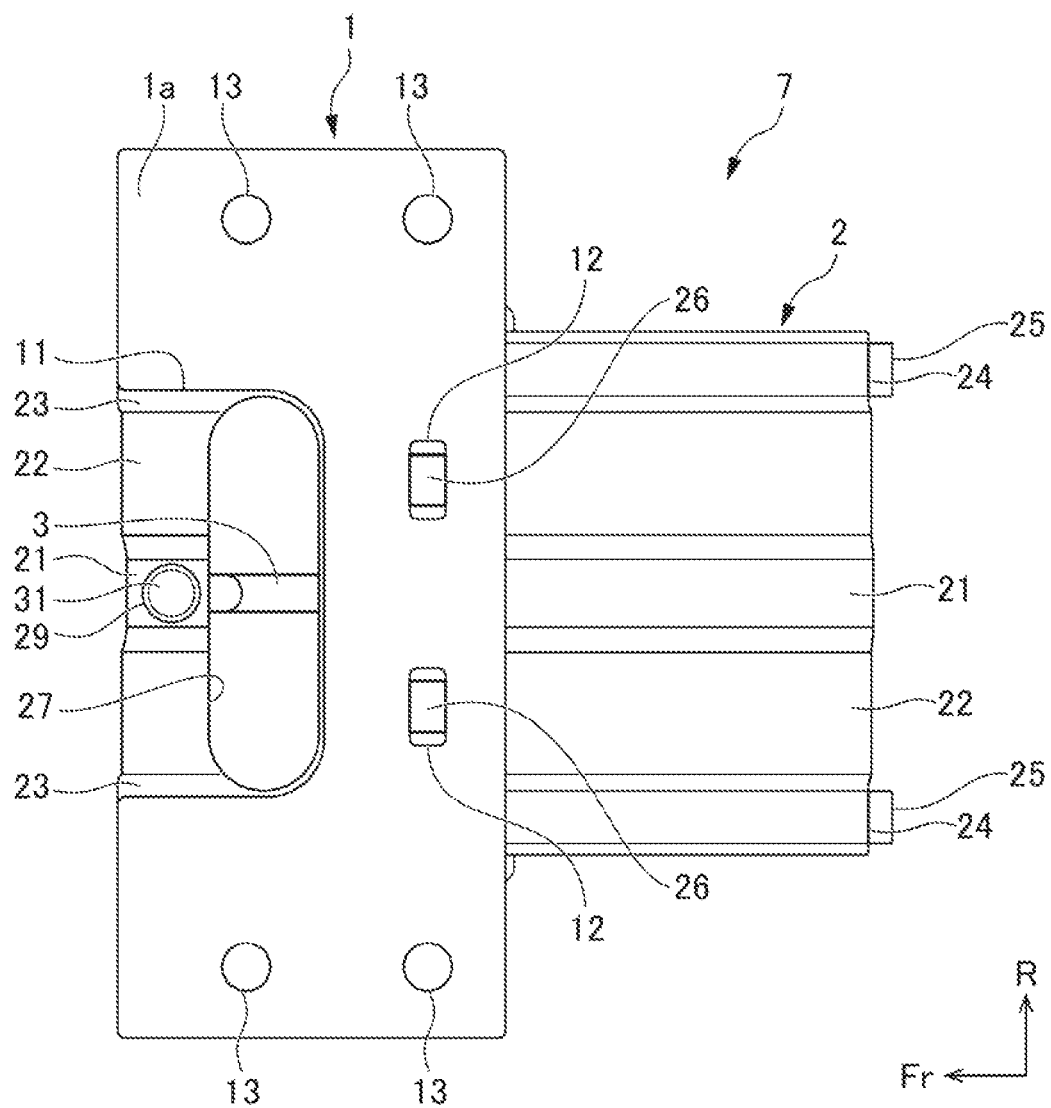
FIG. 6 is a plan view of the hood retraction structure according to the above embodiment.
Figure 7:
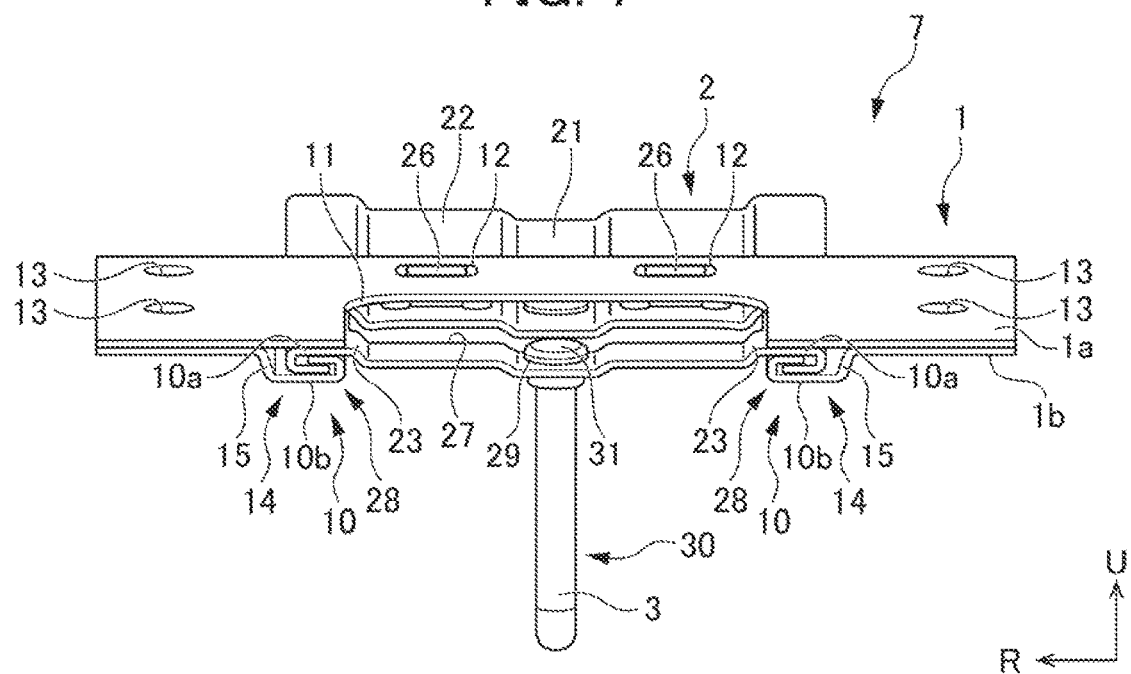
FIG. 7 is a view of the hood retraction structure according to the embodiment as viewed from the front of the vehicle.
Figure 8:
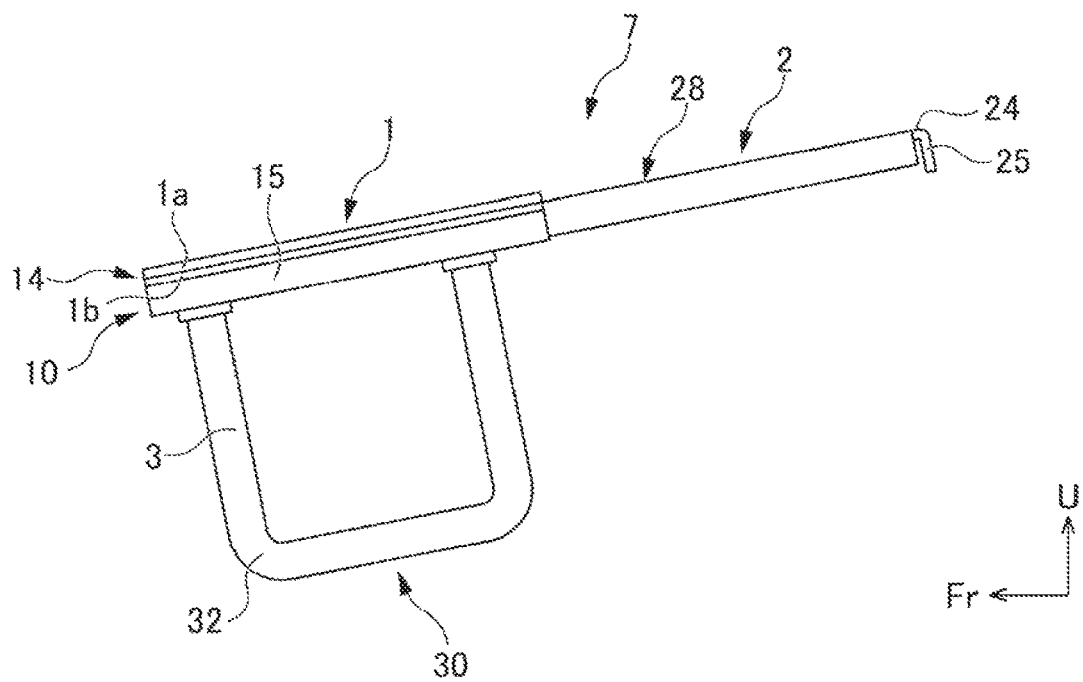
FIG. 8 is a side view of the hood retraction structure according to the embodiment.
Figure 9:
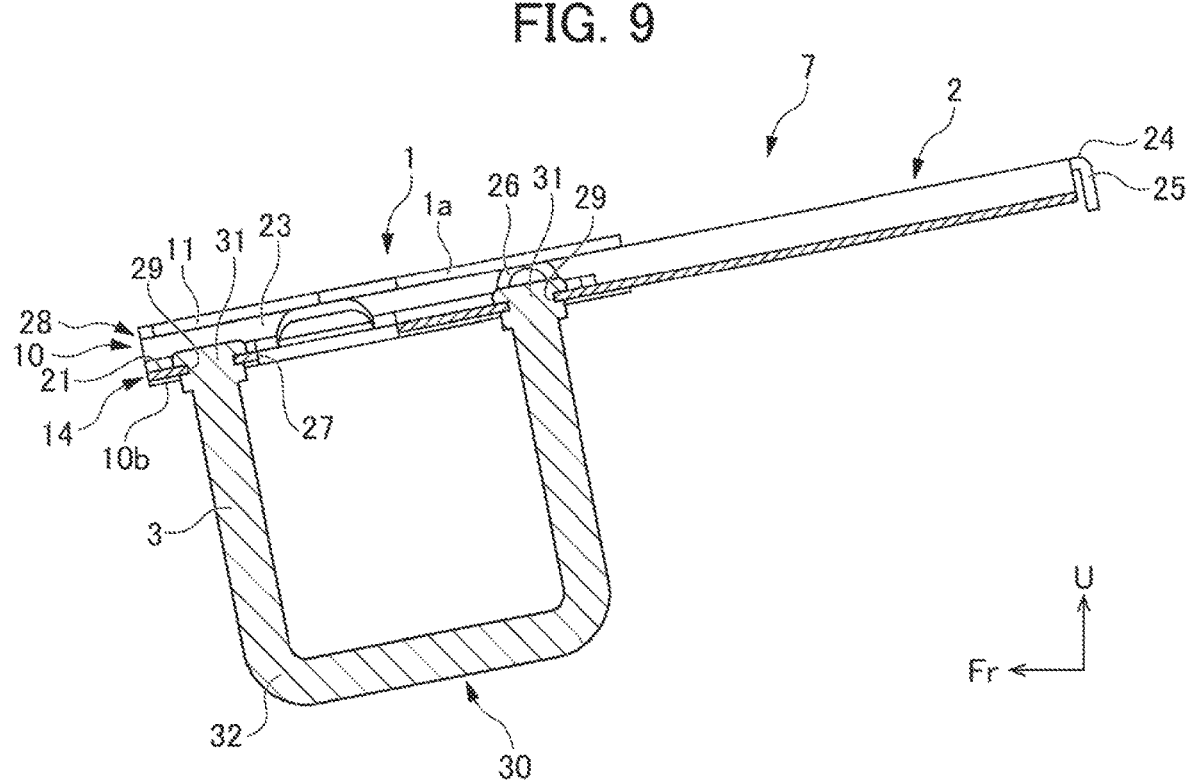
FIG. 9 is a cross-sectional side view of the hood retraction structure according to the embodiment in the middle in the vehicle width direction.
Figure 10:
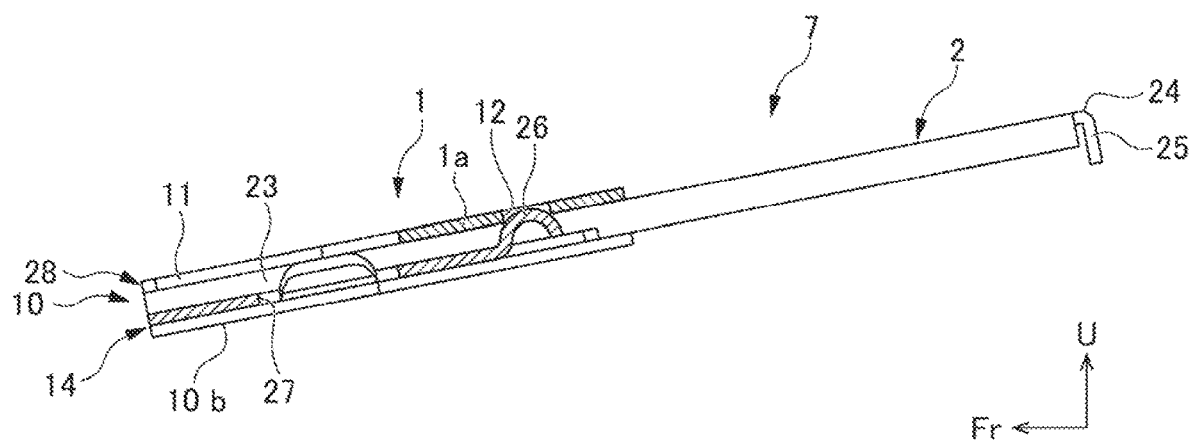
FIG. 10 is a cross-sectional side view of a locking portion of the hood retraction structure according to the above embodiment.
Figure 11:
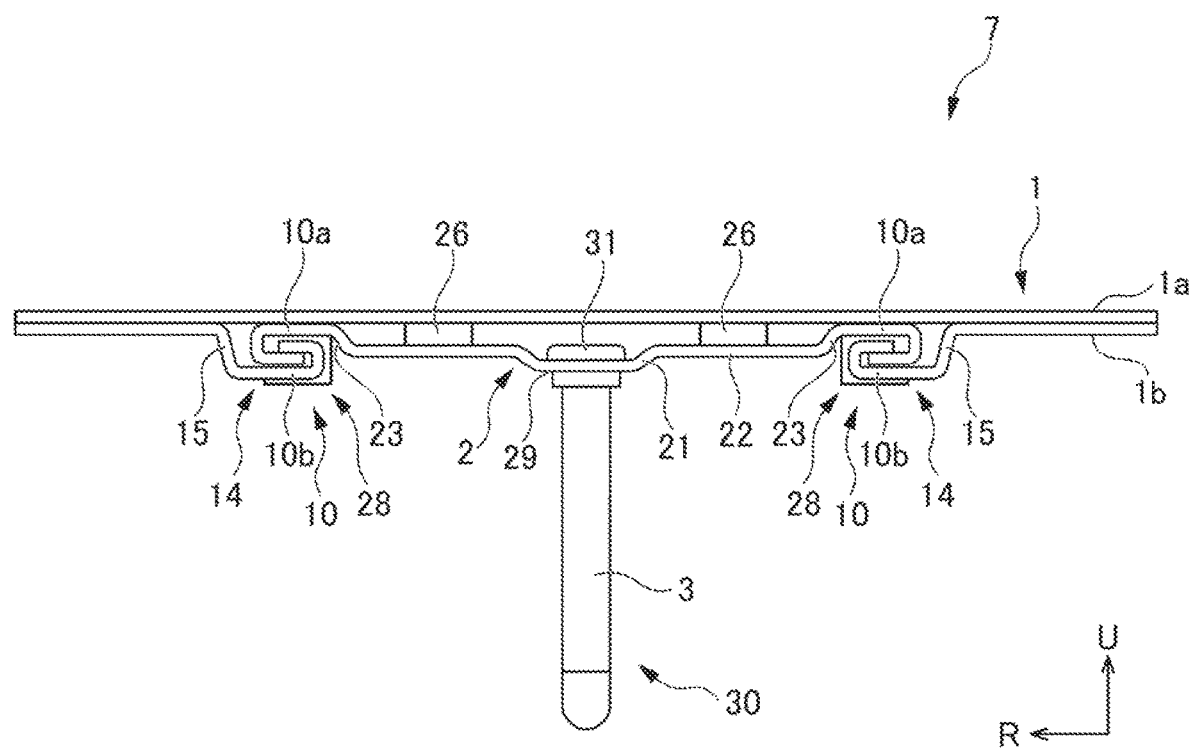
FIG. 11 is a front view of the hood retraction structure according to the above embodiment.
Figure 12:
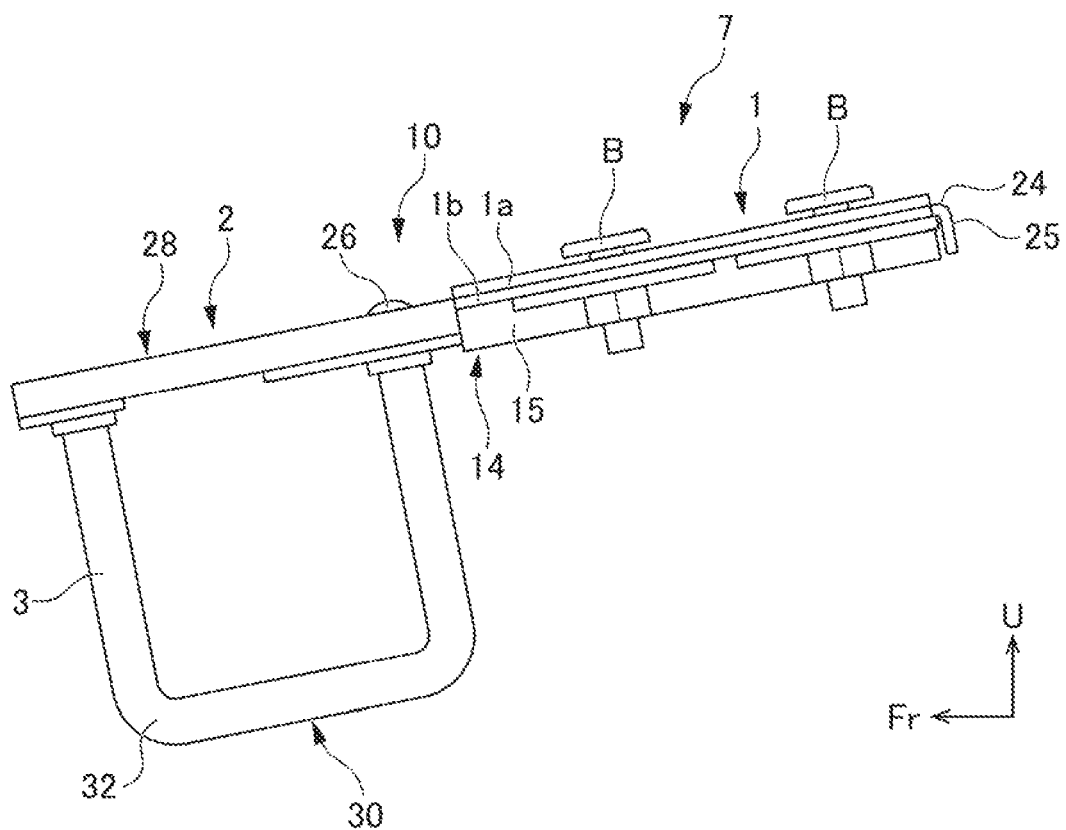
FIG. 12 is a side view of the hood retraction structure according to the above embodiment when the pop-up hood system is operated.

Here, FIG. 5 is a perspective view of the hood retraction structure 7 according to the present embodiment. FIG. 6 is a plan view of the hood retraction structure 7 according to the present embodiment. FIG. 7 is a view of the hood retraction structure 7 according to the present embodiment as viewed from the front of the vehicle. FIG. 8 is a side view of the hood retraction structure 7 according to the present embodiment. FIG. 9 is a cross-sectional side view of the hood retraction structure 7 according to the present embodiment in the middle in the vehicle width direction. FIG. 10 is a cross-sectional side view of a locking portion 26 of the hood retraction structure 7 according to the present embodiment. FIG. 11 is a front view of the hood retraction structure 7 according to the present embodiment. FIG. 12 is a side view of the hood retraction structure 7 according to the present embodiment when the pop-up hood system 9 is operated.

As described above, the hood retraction structure 7 according to the present embodiment retracts the hood 8 relative to the hood locking mechanism 6 when the pop-up hood system 9 is operated. Before the pop-up hood system 9 operates, the slider 1 is disposed on the front side of a rail 2, and the front end of the slider 1 is disposed in the vicinity of the front end of a striker body 3 in the vehicle longitudinal direction. As shown in FIGS. 3 to 12, the hood retraction structure 7 according to the present embodiment includes the slider 1, the rail 2, and the striker body 3. That is, the hood retraction structure 7 according to the present embodiment includes the slider 1, the rail 2 and the striker body 3 that constitute the striker 30.

As shown in FIGS. 3 and 4, the slider 1 is fastened to the front side lower portion 80 of the hood 8 by means of four bolts B. More specifically, the slider 1 is fastened by each bolt B being fastened (welded) to the hood frame 83, and by using nuts (not shown) from below. Therefore, as shown in FIGS. 5 and 6, the slider 1 has bolt holes 13 through which the bolts B extend. Two of the bolt holes 13 are provided on each of both sides in the vehicle width direction in a manner being spaced apart from each other in the vehicle longitudinal direction. However, the number of bolts and bolt holes can be changed as appropriate, and the slider 1 may be fastened by bolting from below by welding nuts to the hood frame 83 side. Furthermore, the slider 1 is coupled to the rail 2, which will be described later, so as to be relatively movable in the vehicle longitudinal direction. As described later, since the striker body 3 that engages the latch 4 provided in the vicinity of the vehicle body VB is fastened to the rail 2, the relative movement in the vehicle longitudinal direction between the slider 1 and the rail 2 allows the hood 8 to be retractable relative to the hood locking mechanism 6.

As shown in FIGS. 5, 7, 11, etc., the slider 1 is formed by attaching an upper slider panel 1a and a pair of lower slider panels 1b and 1b to each other. The pair of lower slider panels 1b and 1b are disposed on both sides of the vehicle width direction perpendicular or substantially perpendicular to the moving direction of the slider 1. That is, the middle of the slider 1 in the vehicle width direction includes only the upper slider panel 1a. As shown in FIGS. 3 and 4, the upper slider panel 1a and the pair of lower slider panels 1b and 1b are fastened together when the slider 1 is fastened to the front side lower portion 80 of the hood 8 by the bolts B.

As shown in FIGS. 5, 6, etc., the slider 1 fastened to the hood 8 has a shorter length in the moving direction as compared with the rail 2 described later, so that the force required when the slider 1 and the hood 3 slide rearward of the vehicle is small. Therefore, the response at the time of the retraction of the slider 1 and the hood 8 becomes faster, and the retraction operation of the slider 1 and the hood 8 becomes stable. Furthermore, the slider 1 has a substantially rectangular shape having a notch 11 described later, and is arranged so that the short-side direction corresponds to the longitudinal direction of the vehicle. As a result, the length of the slider 1 in the moving direction becomes shorter, and the required force becomes smaller, so that the response becomes faster and the retraction operation becomes more stable.

As shown in FIGS. 5, 7, 11, etc., the slider 1 and the rail 2 to be described later are movably connected relatively in the vehicle longitudinal direction by a pair of slide portions 10 and 10 which are spaced apart in the vehicle width direction. The pair of slide portions 10 and 10 are provided to be spaced apart in the vehicle width direction, and are arranged at both ends in the vehicle width direction of the rail 2 to be described later. Both the slider 1 and the rail 2 described later are made of a plate material, and the plate materials of the slider 1 and the rail 2 are folded back and engaged with each other to form the pair of slide portions 10 and 10.

More specifically, as shown in FIGS. 5, 7, 11, etc., the pair of slide portions 10 and 10 include a pair of slider folded portions 14 and 14 which are formed by folding back each inner end of the pair of lower side slider panels 1b and 1b toward the outside in the vehicle width direction, and extend in the vehicle longitudinal direction. Furthermore, the pair of slide portions 10 and 10 includes a pair of rail folded portions 28 and 28 which are formed by folding back both outer ends in the vehicle width direction of the rail 2 described later toward the inner side in the vehicle width direction, and extend in the vehicle longitudinal direction. Then, the pair of slide portions 10 and 10 are formed such that these pair of slider folded portions 14 and 14, and the pair of rail folded portions 28 and 28 are engaged with each other in a movable manner in the vehicle longitudinal direction.

As shown in FIGS. 5, 7, 11, etc., the pair of lower slider panels 1b and 1b include a pair of slider stepped portions 15 and 15 extending downward in a manner connecting to each of the lower ends 10b and 10b of the pair of slide portions 10 and 10 on both the insides in the vehicle width direction. The pair of slider stepped portions 15 and 15 enables the slide portions 10 and 10 to be provided between the upper slider panel 1a and the pair of lower slider panels 1b and 1b.

As shown in FIGS. 5 and 6 and the like, the slider 1 has the notch 11 having an open end formed by notching in a concave shape toward the vehicle rear side from the vehicle front side. The notch 11 is formed in a substantially rectangular shape, the length in the vehicle width direction is substantially equal to the width of the rail plate 22 of the rail 2 to be described later, and the length in the vehicle longitudinal direction is substantially half the length in the vehicle longitudinal direction of the slider 1. As will be described later, the notch 11 is provided at a position corresponding to the upper portion of a secondary lever 5 that constitutes the hood locking mechanism 6 and regulates the upward movement of the striker body 3. Since the secondary lever 5 rotates, the notch 11 has an elongated shape in the vehicle width direction. This avoids an upper end 52 of the secondary lever 5 from interfering with the slider 1.

Furthermore, as shown in FIGS. 5, 6, 10, etc., the slider 1 has a pair of substantially rectangular locking holes 12 and 12 with which a pair of locking portions 26 and 26 provided on the rail 2 are locked. The pair of locking holes 12 and 12 is respectively provided at each position in the vehicle width direction corresponding to the pair of locking portions 26 and 26 provided to be spaced apart in the vehicle width direction on a rail plate 22 of the rail 2 to be described later.

As shown in FIGS. 5, 7, 9, 11, 12, etc., the rail 2 is provided on an upper portion 31 of the striker body 3 constituting the hood locking mechanism 6. The rail 2 is coupled to the slider 1 via the slide portions 10 and 10 such that the slider 1 is relatively movable in the vehicle longitudinal direction. The longitudinal length of the rail 2 is set to be longer than that of the slider 1, thereby ensuring a sufficient moving distance when the slider 1 and the hood 8 are retracted.

As shown in FIGS. 5 to 7, 11, etc., the rail. 2 has a plate-shaped rail plate 22 provided between the pair of slide portions 10 and 10. The rail 2 has a convex portion 21 protruding downward in the rail plate 22 between the pair of slide portions 10 and 10. With reference to the rail plate 22, the convex portion 21 can also be referred to as a recess which is recessed downward from the rail plate. The convex portion 21 extends in the vehicle longitudinal direction at a predetermined width. With the convex portion 21, the rigidity of the rail 2 is increased, and the retracting operation of the slider 1 and the hood 8 is stabilized.

As shown in FIGS. 5 to 7, 9, 11, 12, etc., upper portions 31 and 31 of the striker body 3, which is substantially U-shaped in a side view to be described later, are fastened to the convex portion 21. The upper portions 31 and 31 of the striker body 3 are inserted into a pair of rail through holes 29 and 29 provided to be spaced apart in the vehicle longitudinal direction in the convex portion 21, respectively, and are fastened in a state protruding from the upper surface of the convex portion 21. More specifically, the upper portions 31 and 31 of the striker body 3 are each fastened to the convex portion 21 by, for example, a nut, or swaged. In the present embodiment, since the upper portion 31 of the striker body 3 is fastened to the convex portion 21, the upper portion 31 of the striker body 3 is prevented from interfering with the slider 1.

As shown in FIGS. 5 to 7, 11, etc., the rail plate 22 has, on both sides in the vehicle width direction, a pair of rail stepped portions 23 and 23 extending upward in a manner connecting to the respective upper ends 10a and 10a of the pair of slide portions 10 and 10. The pair of rail stepped portions 23 and 23 extend in the vehicle longitudinal direction. With the pair of rail stepped portions 23 and 23, the rigidity of the rail 2 is further increased, and the retracting operation of the slider 1 and the hood 8 is more stabilized.

As shown in FIGS. 5, 7, 11, etc., as described above, the rail 2 has a pair of rail folded portions 28 and 28 which are formed by folding both outer ends in the vehicle width direction toward the inside of the vehicle width direction, and extend in the vehicle longitudinal direction. The pair of slide portions 10 and 10 formed by the pair of rail folded portions 28, 28 engaging with the pair of slider folded portions 14, 14 allow the slider 1 and the hood 8 to retract.

As shown in FIGS. 5, 8 to 10, 12, etc., a pair of stopper portions 25 and 25 that regulate the retraction of the slider 1 are provided at the rear portion of the rail 2. More specifically, the pair of stopper portions 25 and 25 are provided to be spaced apart at both end portions in the vehicle width direction of the rail 2, and disposed at the rear end of the rail 2. The pair of stopper portions 25 and 25 is continuously provided through the folded portion 24 from the rail 2. The pair of stopper portions 25 and 25 extends downward from the folded portion 24, and the distal ends thereof extend to a position that interferes with the lower ends 10b and 10b of the slide portions 10 and 10 when the slider 1 retracts and reaches the rear end of the rail 2. As a result, when the slider 1 is retracted, the pair of slider folded portions 14 and 14 constituting the pair of slide portions 10 and 10 interferes with the pair of stopper portions 25 and 25, respectively, thereby reliably regulating the retraction of the slider 1.

Furthermore, a deceleration mechanism (not shown) that reduces the retraction speed of the slider 1 is provided at the rear portion of the rail 2. As the deceleration mechanism, for example, a structure is exemplified in which the clearance between the rail 2 (the rail folded portions 28 and 28) and the slider 1 (the slider folded portions 14 and 14) in the pair of slide portions 10 and 10 is made smaller at the rear portion than at the front portion. Alternatively, a projection or the like provided on the rail plate 22 in front of the stopper portions 25 and 25 functions as a deceleration mechanism. This deceleration mechanism allows the retracting operation of the slider 1 and the hood 8 to be gradually decelerated, and the impact load on the pair of stopper portions 25 and 25 and the slider 1 and the hood 8 is reduced.

As shown in FIGS. 5 to 7, 9, 10, etc., the rail 2 includes a pair of locking portions 26 and 26 that regulate the movement of the slider 1 before the pop-up hood system 9 is operated. The pair of locking portions 26 and 26 are provided on the rail plate 22 so as to be spaced apart in the vehicle width direction across the convex portion 21. The pair of locking portions 26 and 26 are locked in the locking holes 12 and 12 of the slider 1 in a normal state before the operation of the pop-up hood system 9, thereby regulating the retracting movement of the slider 1.

Furthermore, as shown in FIG. 10, etc., the pair of locking portions 26 and 26 are constituted by a cantilevered plate spring which is flexibly deformed in such a manner that the hood 8 can retract when the pop-up hood system 9 is operated. The pair of locking portions 26 and 26 including such a cantilevered plate spring are each formed by bending a belt-shaped locking piece which is formed by cutting the rail plate 22 in a substantially C-shape which is open to the front direction of the vehicle so as to be convex upward. When the pop-up hood system 9 is operated, the slider 1 bends and deforms the pair of locking portions 26 and 26 to move over them, thereby allowing the slider 1 and the hood 8 to retract.

As shown in FIGS. 5 to 7, 9, 10, etc., the pair of locking portions 26 and 26 is provided on both sides in the vehicle width direction across the striker body 3 provided between the pair of slide portions 10 and 10. Since the locking portions 26 and 26 are provided in a pair on both sides in the vehicle width direction across the striker body 3, the load at the time of locking the slider 1 is dispersed.

As shown in FIGS. 5 to 7, etc., the rail 2 has an opening 27 having a closed cross-section. The length in the vehicle width direction of the opening 27 is substantially equal to the width of the rail plate 22, and the opening 27 has a substantially elliptical shape in a plan view. As will be described later, the opening 27 is provided at a position corresponding to the upper portion of the secondary lever 5 to be described later. Since the secondary lever 5 rotates, the opening 27 has an elongated shape in the vehicle width direction. This avoids the upper end 52 of the secondary lever 5 from interfering with the rail 2.

The slider 1 and the rail 2 described above may be made of any material such as iron, aluminum, and resin; however, in the present embodiment, all of them are made of iron. Since iron is tougher than aluminum or other materials, it is possible to reduce or prevent the retraction of the slider 1 and hood 8 from being disturbed. Since the locking portions 26 and 26 are also made of iron, they tend to be elastically deformed. Furthermore, the slider 1 also includes a coating layer or a cover that covers the surface of the iron. The coating layer is made of a rust inhibitor, and the material of the cover is not particularly limited. As a result, even if the slider 1 and the rail 2 are made of iron, rust is suppressed, and the retraction of the slider 1 and the hood 8 is reduced or prevented from being disturbed by rust.

Next, the hood retraction structure 7 according to the present embodiment will be described in more detail with reference to FIGS. 13 to 18 based on the relationship with the hood locking mechanism 6.

Figure 13:
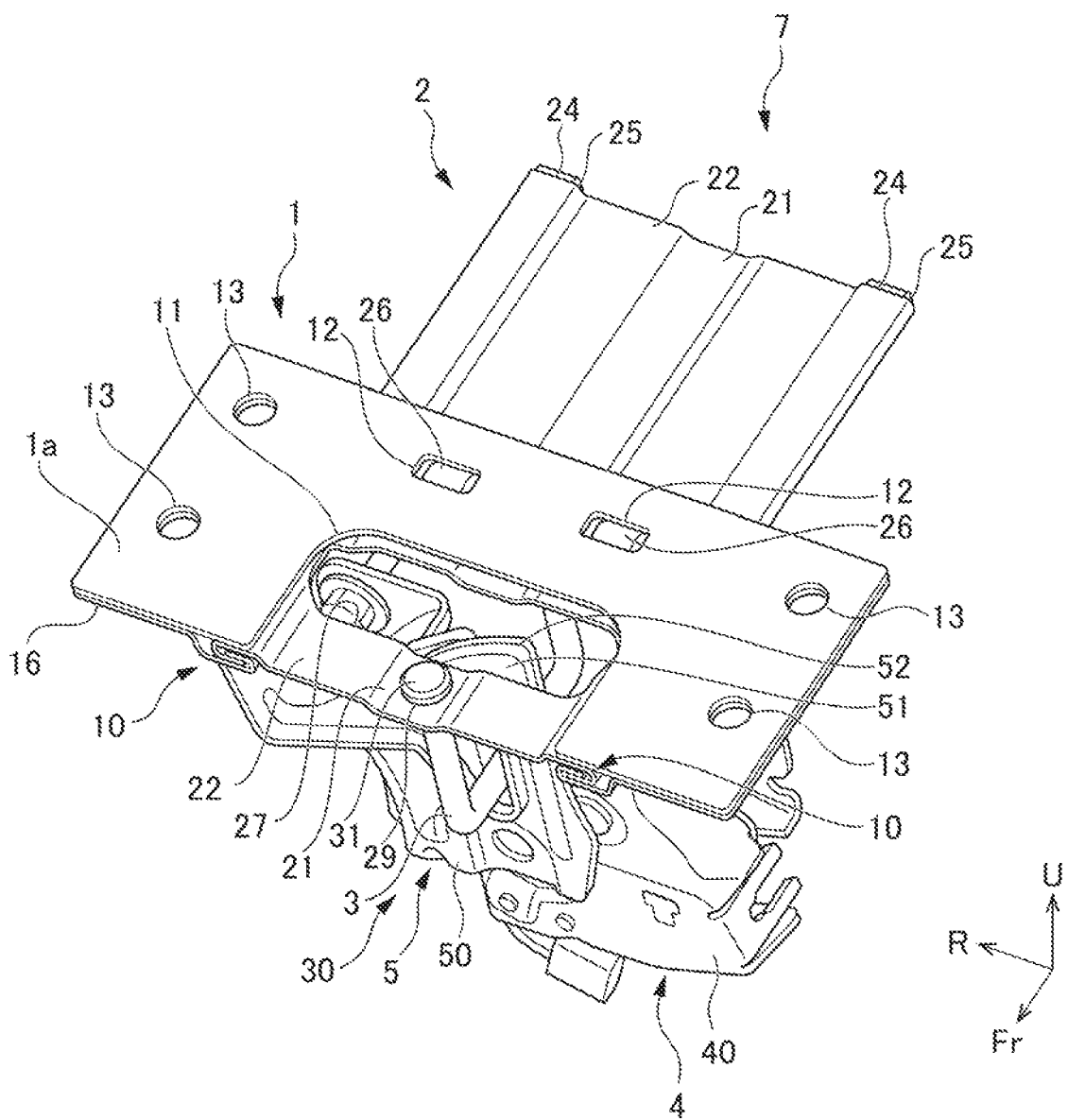
FIG. 13 is a perspective view of the hood retraction structure and a hood locking mechanism according to the embodiment.
Figure 14:
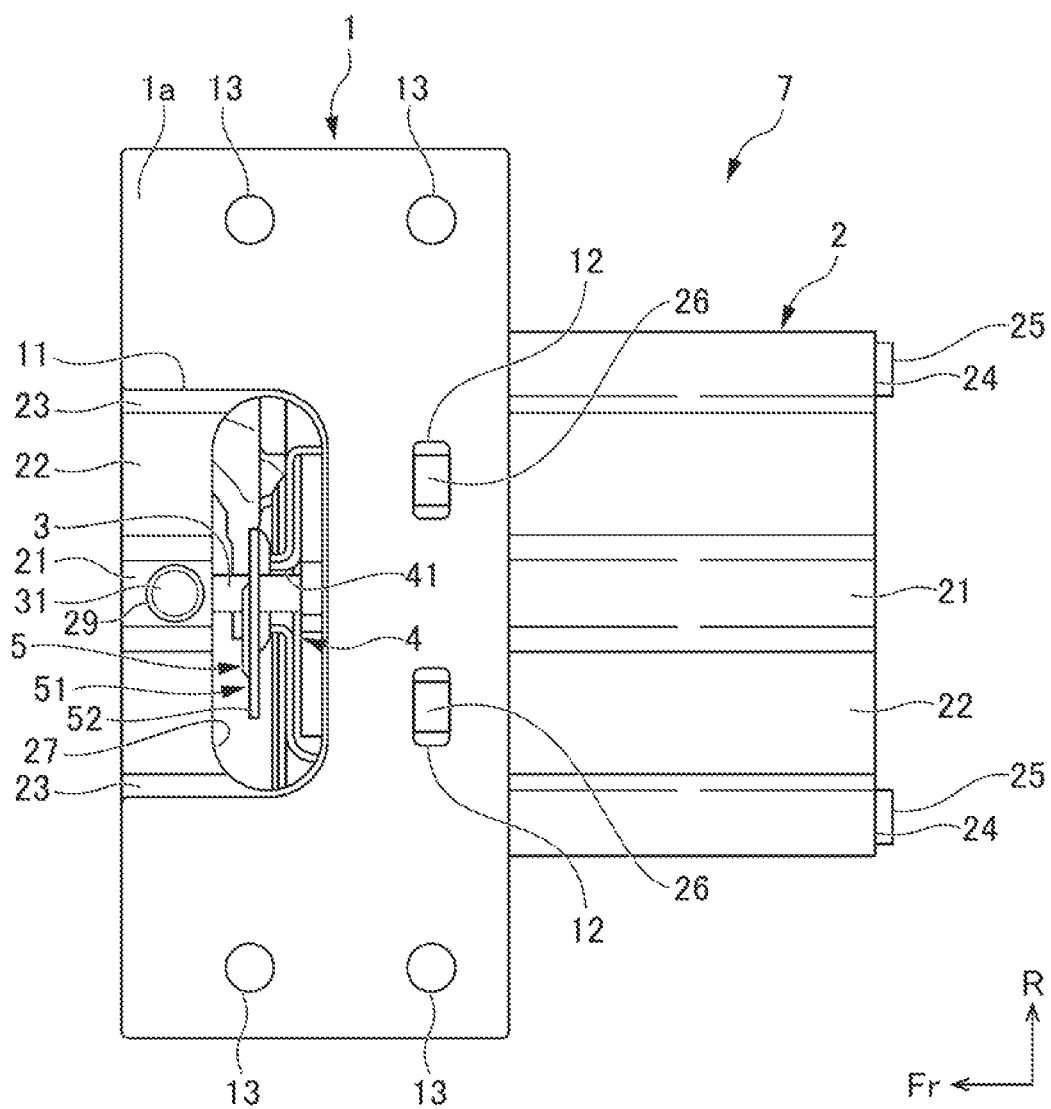
FIG. 14 is a plan view of the hood retraction structure and the hood locking mechanism according to the embodiment.
Figure 15:
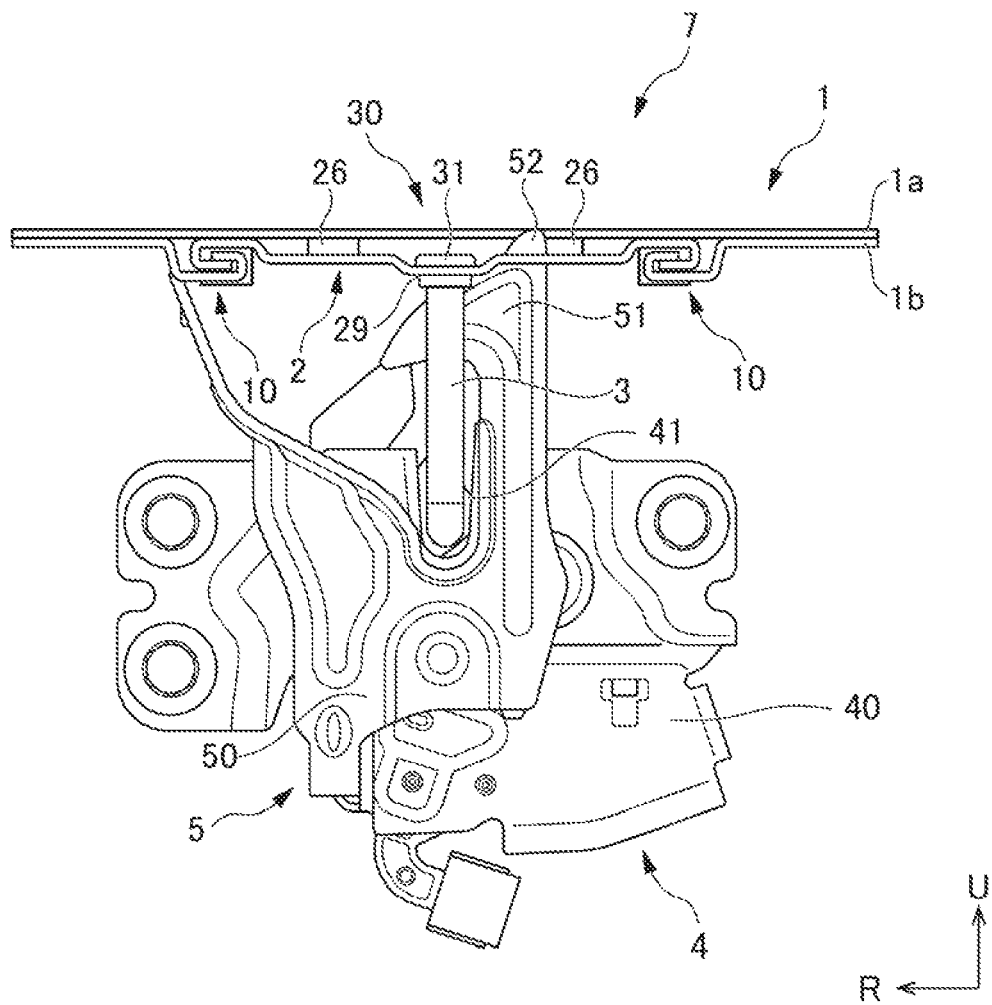
FIG. 15 is a front view of the hood retraction structure and the hood locking mechanism according to the embodiment.
Figure 16:
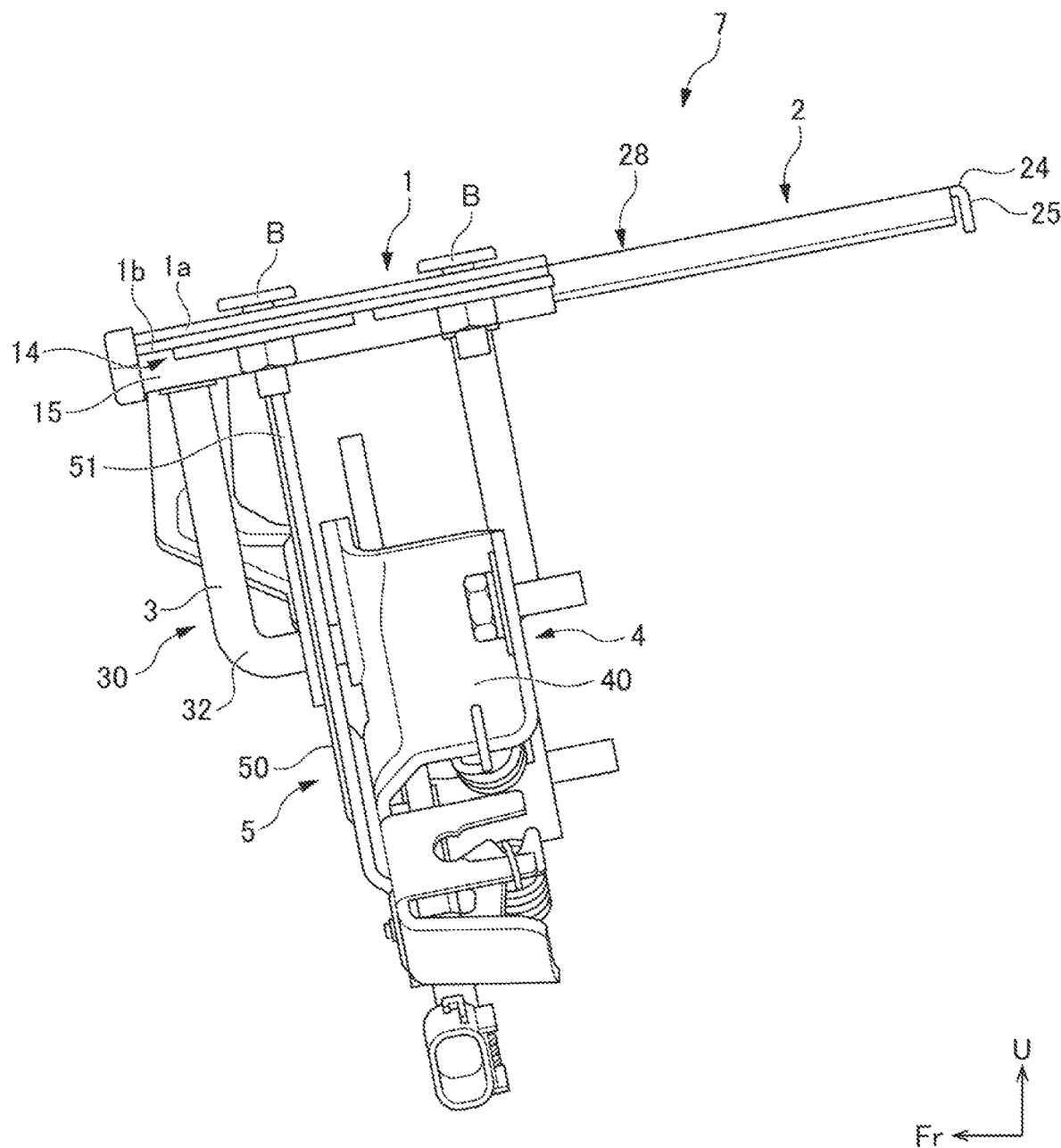
FIG. 16 is a side view of the hood retraction structure and the hood locking mechanism according to the embodiment.
Figure 17:
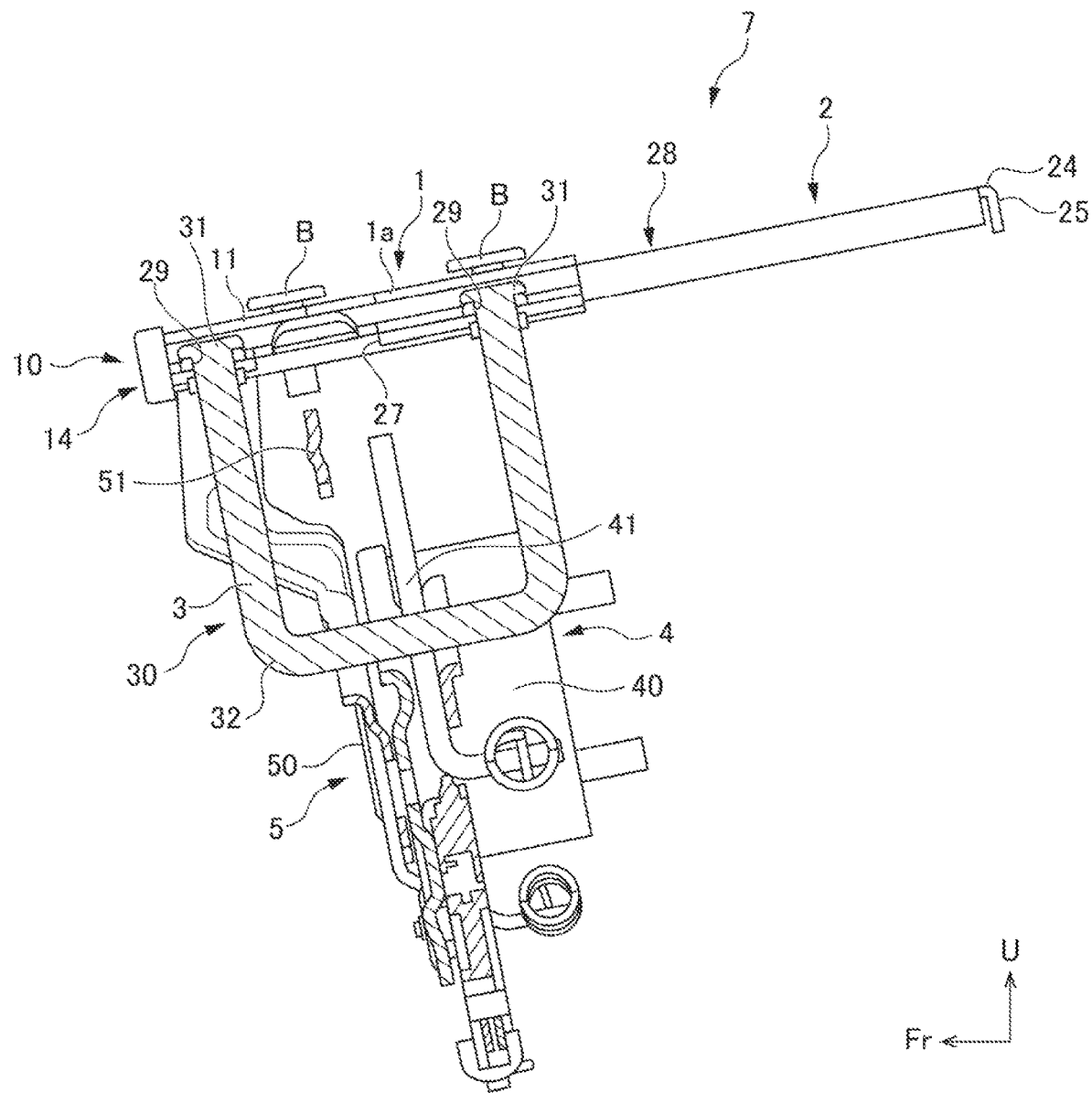
FIG. 17 is a cross-sectional side view of the hood retraction structure and the hood locking mechanism according to the above embodiment in the middle in the vehicle width direction.
Figure 18:
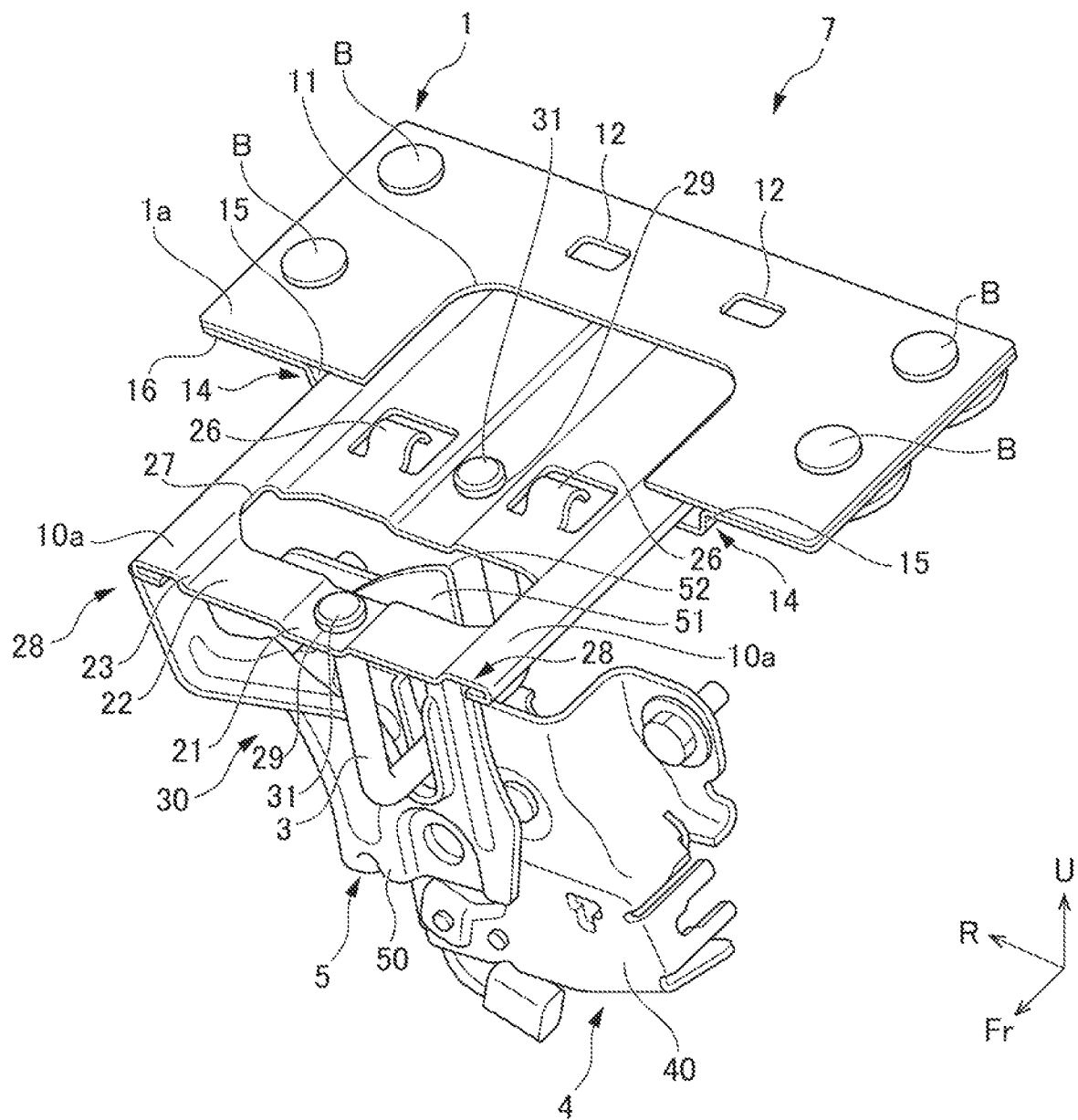
FIG. 18 is a perspective view of the hood retraction structure and the hood locking mechanism according to the above embodiment, and a view when the pop-up hood system is operated.

Here, FIG. 13 is a perspective view of the hood retraction structure 7 and the hood locking mechanism 6 according to the present embodiment. FIG. 14 is a plan view of the hood retraction structure 7 and the hood locking mechanism 6 according to the present embodiment. FIG. 15 is a front view of the hood retraction structure 7 and the hood locking mechanism 6 according to the present embodiment. FIG. 16 is a side view of the hood retraction structure 7 and the hood locking mechanism 6 according to the present embodiment. FIG. 17 is a cross-sectional side view in the vehicle width direction center of the hood retraction structure 7 and the hood locking mechanism 6 according to the present embodiment. FIG. 18 is a perspective view of the hood retraction structure 7 and the hood locking mechanism 6 according to the present embodiment when the pop-up hood system 9 is operated.

As shown in FIGS. 13 to 18, the hood locking mechanism 6 that locks the hood 8 includes the striker 30 including the rail 2 and the striker body 3 described above, the latch 4 that is provided in the vicinity of the vehicle body VB and locks the striker 30, the secondary lever 5 that is provided in the vicinity of the vehicle body VB and regulates the upward movement of the striker body 3.

As shown in FIGS. 13 to 18, the latch 4 includes a latch body portion 40 and a latch engagement portion 41. The latch engagement portion 41 is rotatably supported by the latch body portion 40. The latch body portion 40 includes a lock portion that locks the rotation of the latch engagement portion 41, and a latch spring that biases the latch engagement portion 41 in the release direction. When operating a hood opening lever provided at a driver's seat, in the latch engagement portion 41, the lock of the lock portion is released, and by rotating by the biasing force of the latch spring, the striker body 3 is released from the locked position of the latch engagement portion 41. Thus, the locking of the hood 8 by the latch 4 is released.

It should be noted that the latch 4 has a pop-up function of raising the latch engagement portion 41 when the hood 8 is lifted, in conjunction with the operation of the pop-up hood system 9. Thus, it is possible to move the rear end side in the trajectory of tilting forward by raising the rear end side while moving the hood 8 rearward smoothly, in conjunction with the hood retraction structure 7 according to the present embodiment. However, the pop-up function of the latch 4 may be optional, and the latch 4 may not have a pop-up function.

As shown in FIGS. 13 to 18, the secondary lever 5 has a lever body portion 50, and a hook portion 51. The hook portion 51 regulates the upward movement of the striker body 3 fastened to the lifted hood 8 when the lock of the latch 4 is released by opening the hood opening lever provided at the driver's seat. By operating the lever body portion 50, the locking of the hook portion 51 is released, and the hood 8 is opened.

As described above, as shown in FIGS. 13 to 15 and 18, the slider 1 has the notch 11 having an opening end formed by being cut in a concave shape from the vehicle front side toward the vehicle rear side, and the notch 11 is provided at a position corresponding to the upper portion of the secondary lever 5. When the position of the slider mechanism is lowered from the viewpoint of size reduction of the apparatus, the upper end 52 of the secondary lever 5 as shown in FIGS. 13 15, etc., reaches the position of the slider 1. This may cause interference with the slider 1. To the contrary, in the present embodiment, providing the notch 11 in the slider 1 avoids interference of the upper end 52 of the secondary lever 5 with respect to the slider 1. Furthermore, even when the slider 1 is retracted during the operation of the pop-up hood system 9 shown in FIG. 18 from the position at the normal time shown in FIG. 13, since the notch 11 is provided in the front direction of the vehicle, the slider 1 does not interfere with the upper end 52 of the secondary lever 5.

Furthermore, as described above, as shown in FIGS. 13 to 15 and 18, the rail 2 has the opening 27 having a closed cross section, and the opening 27 is provided at a position corresponding to an upper portion of the secondary lever 5. Thus, similarly to the notch 11, the interference of the upper end 52 of the secondary lever 5 with respect to the rail 2 is avoided.

As shown in FIGS. 13 to 18, the striker body 3 which is fastened to the convex portion 21 of the rail 2 is in a side view substantially U-shaped. The curvature of the inner surface in a front side corner portion 32 of the striker body 3 substantially coincides with the curvature of the engagement surface in the latch engagement portion 41 that engages the striker body 3 of the latch 4 to be described later provided in the vicinity of the vehicle body VB. Thus, when the slider 1 and the hood 8 are tilted forward in the retracting operation, the striker body 3 smoothly moves in a rotatable manner with respect to the latch 4 with the front side corner portion 32 as the rotational center.

The operation of the hood retraction structure 7 according to the present embodiment having the above configuration will be described.

First, when a collision detection sensor such as a pressure sensor or a camera (not shown) equipped to the vehicle V detects a collision with a target to be protected, the pop-up hood system 9 starts to operate under the control of a control unit (for example, an ECU) (not shown). Then, an actuator provided in the pop-up hood system 9 is driven to lift up the hood 8.

At this time, the pop-up function of the latch 4 also operates, and the latch 4 is also raised. While the locking of the latch 4 with respect to the striker body 3 is maintained, the hood 8 is relatively retracted relative to the latch 4 in the vicinity of the vehicle body VB by the amount of play of the striker body 3 and the latch 4.

Then, after the play of the striker body 3 and the latch 4 is eliminated, the striker body 3 rotates with respect to the latch 4 with the front side corner portion 32 as a rotational center. As a result of this rotation, the slider 1 and the hood 8 assume a more forward inclined posture.

Then, the slider 1 bends and deforms the pair of locking portions 26 and 26 to move over them, and starts the retraction operation relative to the rail 2. That is, the hood 8 is relatively retracted relative to the hood locking mechanism 6 including the latch, the rail 2, and the striker 30. In the retraction operation of the slider 1 and the hood 8, the speed is gradually reduced by the deceleration mechanism, and the retraction operation is stopped by the stopper portions 25 and 25.

Thus, by moving in the trajectory of tilting forward by raising the rear end while the hood 8 moves rearward of the vehicle, added clearance is provided between the engine compartment E and the hood 8 such that the impact in the event of the collision between the vehicle body VB and the target to be protected is reduced.

The advantageous effects of the hood retraction structure 7 according to the present embodiment described above are summarized as follows.

The hood retraction structure 7 according to the present embodiment includes the slider 1 provided at the front side lower portion 80 of the hood 8; and the rail 2 that is provided on the upper portion 31 of the striker body 3 constituting the hood locking mechanism 6, movable in a longitudinal direction relative to the slider 1, and is longer than the slider 1 in a length in the longitudinal direction. Furthermore, retraction of the slider 1 relative to the rail 2 allows the hood 8 to retract relative to the hood locking mechanism 6. Thus, the slider 1 can be positioned on the front end side of the rail 2 before the pop-up hood system 9 operates, and the slider 1 can be moved rearward of the rail 2 when the pop-up hood system 9 operates. Therefore, at the normal time before the pop-up hood system 9 operates, it is possible to reduce the amount of the hood 8 protruding forward from the striker body 3 (overhang amount), and reduce the stroke when the front end of the hood 8 rotates downward. Therefore, according to the hood retraction structure 7 of the present embodiment, it is possible to effectively utilize the vehicle space, and the design property is also improved.

According to the present embodiment, since a rigid member is not present at the front side of the striker body 3, the pedestrian protection performance is improved. Furthermore, in the event of collision with a pedestrian, the operation of the pop-up hood system 9 and the retraction of the hood 8 are necessary at an early stage; however, according to the present embodiment, since the length of the slider 1 on the moving side is shorter than the rail 2 and is light, the force required when the slider 1 slides toward the rear of the vehicle is small. Therefore, the retreating operation of the hood 8 is stabilized, and the response when the hood 8 is retracted is also fast.

Furthermore, in the hood retraction structure 7 according to the present embodiment, the slider 1 and the rail 2 move relative to each other in the longitudinal direction at the pair of slide portions 10 and 10 which are spaced apart from each other in the vehicle width direction. The rail 2 includes the convex portion 21 that protrudes downward between the pair of slide portions 10 and 10, and the upper portion 31 of the striker body 3 is fastened to the convex portion 21. Thus, since the rigidity of the rail 2 increases by the presence of the convex portion 21, the deflection of the rail 2 is suppressed during sliding of the slider 1, the retracting operation of the hood 8 is stabilized. Furthermore, upon fastening the striker body 3 to the rail 2, the upper portion 31 of the striker body 3 is normally inserted into the through hole provided in the rail 2 and fastened in a state protruding on the upper surface side of the rail 2; however, according to the present embodiment, since the upper portion 31 of the striker body 3 is fastened to the convex portion 21 projecting downward, it is possible to avoid the upper portion 31 of the striker body 3 interfering with the slider 1.

Furthermore, in the hood retraction structure 7 according to the present embodiment, the convex portion 21 is provided on the rail plate 22 provided between the pair of slide portions 10 and 10. The rail plate 22 includes the rail stepped portion 23 and 23 provided on each of both sides in a vehicle width direction, and the rail stepped portion 23 and 23 extend upward to connect to upper ends 10a and 10a of the pair of slide portion 10 and 10. Thus, the rail 2 becomes a two-stage shape from the pair of slide portions 10 and 10 to the convex portion 21, and thus, the rigidity of the rail 2 further increases. Therefore, the retracting operation of the slider 1 and the hood 8 is more stabilized.

Furthermore, in the hood retraction structure 7 according to the present embodiment, the rail includes stopper portions 25 and 25, each of which is provided at a rear portion of the rail 2 and regulate retraction of the slider 1. The stopper portions 25 and 25 are each continuously provided via the folded portion 24 from the rail 2. Thus, it is possible to reliably stop the retracting operation of the slider 1 and the hood 8 by the stopper portions 25 and 25. Furthermore, since the stopper portions 25 and 25 are integrally molded continuously with the rail 2, it is possible to reduce the number of parts.

Furthermore, in the hood retraction structure 7 according to the present embodiment, the rail includes the deceleration mechanism that is provided at the rear portion of the rail 2 and reduce a retraction speed of the slider 1. As a result, the retracting operation of the slider 1 and the hood 8 can be performed with good response in the initial stage of the operation of the pop-up hood system 9, while the retracting operation of the slider 1 and the hood 8 in the later stage of the operation can be gradually decelerated. Therefore, as compared with the case of suddenly stopping the retracting operation of the slider 1 and the hood 8 by the stopper portions 25 and 25, it is possible to reduce the load on the hood 8. In particular, when the retracting operation is regulated by the stopper portion 25 and 25 and the hinge portion 81 of the hood 8 provided on the rear side, unexpected deformation of the hood 8 occurs at the center portion of the hood 8 due to the remaining inertia, and the cushioning of the hood skin 82 may deteriorate; however, according to the present embodiment, this can be avoided. Furthermore, since it is possible to reduce the load applied instantaneously to the stopper portion 25, there is no need to make the stopper portion 25 thick, and thus, it is possible to reduce the cost.

Furthermore, in the hood retraction structure 7 according to the present embodiment, the striker body 3 is in a substantially U-shape in a side view, and the curvature of an inner surface in the front side corner portion 32 of the striker body 3 substantially coincides with the curvature of an engagement surface in the latch engagement portion 41 that engages the striker body 3 of a latch 4 that is provided in the vicinity of the vehicle body VB and constitutes the hood locking mechanism 6. Thus, during the operation of the pop-up hood system 9, relative movement by the play amount of the striker body 3 and the latch 4, occurs, and when the hood 8 moves while being tilted forward after the play is eliminated, it is possible for the striker body 3 to smoothly rotate relative to the latch 4 with the front side corner portion 32 as a rotational center. That is, it is possible to avoid the stress being concentrated at a point when the front side corner portion 32 of the striker body 3 is in contact with the latch engagement portion 41 of the latch 4. Therefore, according to the present embodiment, a smoother and more stable retracting operation of the hood 8 is possible.

Furthermore, in the hood retraction structure 7 according to the present embodiment, the pair of slide portions 10 and 10 are provided to be spaced apart from each other in a vehicle width direction, and are each provided by engaging folded plate members with each other. As a result, the slide mechanism can be configured by the plate member without dividing the slider 1 and the rail 2 into a front portion and a rear portion, for example, and therefore, stable retracting operation of the slider 1 and the hood 8 becomes possible. Furthermore, the engagement allowance can be secured sufficiently, and thus, it is possible to reduce the deformation such as separation of the slider 1 and the rail 2 in the vertical direction by the collision load or the load at the time of the operation of the pop-up hood system 9.

In the hood retraction structure 7 according to the present embodiment, both the slider 1 and the rail 2 are made of iron. Furthermore, the slider 1 has a coating layer covering the surface of iron, and the coating layer is made of a corrosion inhibitor. As a result, since the slider 1 and the rail 2 are made of iron, for example, the slider 1 and the rail 2 are tougher to some extent than aluminum, and therefore, the slider 1 and the rail 2 can move relative to each other even when a bending load is applied, and it is possible to reduce or prevent hindrance of the retracting operation of the hood 8. Furthermore, since the slider 1 is coated with a corrosion inhibitor, it is possible to suppress rust even when it is made of iron, and it is possible to suppress hinderance of the retraction of the hood 8 due to rust.

Furthermore, in the hood retraction structure 7 according to the present embodiment, the rail 2 includes the locking portions 26 and 26 including a cantilevered plate spring which regulates movement of the slider 1 before the pop-up hood system 9 operates, and is flexibly deformed in a manner that the hood 8 retracts when the pop-up hood system 9 operates. As a result, since the slider 1 moves while bending and deforming the sides of the locking portions 26 and 26, the vertical movement of the slider 1 and the damage to the locking portions 26 and 26 can be avoided, such that a stable retracting operation of the hood 8 is possible. Furthermore, since it is possible to avoid damage to the locking portions 26 and 26, the hood retraction structure 7 according to the present embodiment can be reused even after operation of the pop-up hood system 9.

Furthermore, in the hood retraction structure 7 according to the present embodiment, the striker body 3 is provided between the pair of slide portions 10 and 10. Furthermore, the locking portions 26 and 26 are provided in a pair on both sides in the vehicle width direction across the striker body 3. Thus, by the locking portions 26 and 26 being provided in pairs on both sides in the vehicle width direction across the striker body 3, the load for maintaining the locking of the slider 1 is dispersed, and the rigidity of each locking portion 26 can be set low as compared with the case of locking with one locking portion. Furthermore, since the received load of each locking portion 26 is small, it is possible to suppress the stress concentration in the case of elastically deforming each locking portion 26, and since the load itself applied to each locking portion 26 is also small, it is possible to stably slide the slider 1 without being tilted. Furthermore, since the deformation of each locking portion 26 is within the range of elastic deformation, it is possible to suppress the plastic deformation and damage of the locking portion 26, and it is possible to reuse the hood retraction structure 7 even after the operation of the pop-up hood system 9.

Furthermore, in the hood retraction structure 7 according to the present embodiment, the slider 1 is bolted to the front side lower portion 80 of the hood 8. Conventionally, the hood 8 has been integrally provided with the striker body 3; however, according to the present embodiment, the slider 1 is bolted to the front side lower portion 80 of the hood 8, and the upper portion 31 of the striker body 3 is fastened to the slider 1 and the rail 2 coupled to slider 1, the slider mechanism (the slider 1, the rail 2, and the striker body 3) is easily replaced when damaged or the like. Furthermore, when the hood 8 is damaged or the like, it is also possible to reuse the slider mechanism if it remains undamaged.

Furthermore, in the hood retraction structure 7 according to the present embodiment, the slider 1 has the notch 21 having an open end provided by being cut in a concave shape from the vehicle front side toward the vehicle rear side. The notch 11 constitutes the hood locking mechanism 6, and is provided at a position corresponding to an upper portion of the secondary lever 5 that regulates the upward movement of the striker body 3. Thus, when the slider 1 is retracted, the slider 1 does not interfere with the upper end 52 of the secondary lever 5. Therefore, since there is no need to separate the slider 1 and the secondary lever 5 in the vertical direction, it is possible to lower the position of the slider mechanism without increasing the size of the device, and thus, it is possible to secure a large clearance between the hood 8 and the slider mechanism. Therefore, according to the present embodiment, when an object to be protected such as a pedestrian comes into contact with the upper surface of the hood 8, since it is possible to provide the slider mechanism which is a rigid member so as to be spaced apart from the hood skin 82, the protection performance for the target to be protected can be improved. In addition, since the position of the hood 8 can also be lowered, the degree of freedom in design is improved. It should be noted that the notched structure is not limited to the slider mechanism using the rail 2 as in the present embodiment, but also can be applied to a conventional slide mechanism in which the striker shaft is simply bent.

Furthermore, in the hood retraction structure 7 according to the present embodiment, the plate-shaped rail 2 as a slider receiving portion has the opening 27 having a closed cross section. The opening 27 is provided at a position corresponding to the upper portion of the secondary lever 5. Thus, with respect to both the rail 2 and the slider 1, the upper end 52 of the secondary lever 5 does not interfere. Therefore, since the present embodiment is directed to a structure in which the slider 1 is retracted relative to the rail 2, there is no need to notch out the vehicle front side of the rail 2, and thus, it is possible to secure a high rigidity of the rail 2.

It should be noted that the present invention is not limited to the above embodiment, and variations and improvements within a scope achieving the object of the present invention are included in the present invention.

For example, in the embodiment described above, although the pair of locking holes 12 and 12 to be locked by the pair of locking portions 26 and 26 is provided in the slider 1, the present invention is not limited thereto. Instead of the pair of locking holes 12 and 12, a pair of concave portions to be locked by the pair of locking portions 26 and 26 may be formed. Alternatively, the pair of locking holes 12 and 12 may not be provided in the slider 1, and the pair of locking portions 26 and 26 may be locked to the rear end of the slider 1.

EXPLANATION OF REFERENCE NUMERALS 1 slider
1a upper slider panel
1b lower slider panel
10 slide portion
10a upper end of the slide portion
10b lower end of the slide portion
11 notch
12 locking hole
13 bolt hole
14 slider folded portion
15 slider stepped portion
2 rail
21 convex portion
22 rail plate
23 rail stepped portion
24 folded portion
25 stopper portion
26 locking portion
27 opening
28 rail folded portion
29 rail through hole
3 striker body
30 striker
31 upper portion of the striker body
32 front side corner portion of the striker body
4 latch
40 latch body
41 latch engagement portion
5 secondary lever
50 lever body
51 hook portion
52 upper end of the secondary lever
6 hood locking mechanism
7 hood retraction structure
8 hood
80 front side lower portion of the hood
81 hinge portion
82 hood skin
83 hood frame
9 pop-up hood system
b bolt
e engine compartment
f front
v vehicle
vb vehicle body

What is claimed is:

1. A hood retraction structure that allows a hood to retract relative to a hood locking mechanism when a pop-up hood system operates, the hood retraction structure comprising:
a slider provided at a front side lower portion of the hood; and
a rail that is provided on an upper portion of a striker body constituting the hood locking mechanism, is movable in a longitudinal direction relative to the slider, and is longer than the slider in a length in the longitudinal direction,
wherein a retraction of the slider relative to the rail allows the hood to retract relative to the hood locking mechanism,
wherein the slider and the rail move relative to each other in the longitudinal direction at a pair of slide portions which are spaced apart from each other in a vehicle width direction,
the rail includes a convex portion that protrudes downward between the pair of slide portions, and
the upper portion of the striker body is fastened to the convex portion.

2. The hood retraction structure according to claim 1, wherein, before the pop-up hood system operates, the slider is positioned on a front end side of the rail, and when the pop-up hood system operates, the slider moves rearward of the rail.

3. The hood retraction structure according to claim 1, wherein the convex, portion is provided on a rail plate provided between the pair of slide portions, and
the rail plate includes a rail stepped portion provided on each of both sides in a vehicle width direction, the rail stepped portion extending upward to connect to an upper end of each of the pair of slide portions.

4. The hood retraction structure according to claim 1, wherein the rail includes a stopper portion that is provided at a rear portion of the rail and regulates retraction of the slider, and
the stopper portion is continuously provided via a folded portion from the rail.

5. The hood retraction structure according to claim 4, wherein the rail includes a decelerator that is provided at the rear portion of the rail and reduce a retraction speed of the slider.

6. The hood retraction structure according to claim 1, wherein the striker body is in a substantially U-shape in a side view, and
a curvature of an inner surface in a front side corner portion of the striker body substantially coincides with a curvature of an engagement surface in a latch engagement portion that engages the striker body of a latch that is provided in a vicinity of a vehicle body and constitutes the hood locking mechanism.

7. The hood retraction structure according to claim 1, wherein the slider and the rail are coupled to each other in a manner movable relative to each other such that the hood retracts relative to the hood locking mechanism, and the slider and the rail include a pair of slide portions respectively provided to be spaced apart from each other in a vehicle width direction, and each provided by engaging folded plate members with each other.

8. A hood retraction structure that allows a hood to retract relative to a hood locking mechanism when a pop-up hood system operates, the hood retraction structure comprising:
   a slider provided at a front side lower portion of the hood; and
   a rail that is provided on an upper portion of a striker body constituting the hood locking mechanism, is movable in a longitudinal direction relative to the slider, and is longer than the slider in a length in the longitudinal direction,
   wherein a retraction of the slider relative to the rail allows the hood to retract relative to the hood locking mechanism,
   wherein the slider and the rail are provided at a pair of slide portions spaced apart from each other in a vehicle width direction in a manner movable relative to each other in a longitudinal direction, such that the hood retracts relative to the hood locking mechanism,
   the rail includes a locking portion including a cantilevered plate spring which regulates movement of the slider before the pop-up hood system operates, and is flexibly deformed in a manner that the hood retractshen the pop-up hood system operates,
   the striker body is provided between the pair of slide portions, and
   the locking portion includes a pair of locking portions that are provided on both sides in a vehicle width direction across the striker body.

9. The hood retraction structure according to claim 8, wherein, before the pop-up hood system operates, the slider is positioned on a front end side of the rail, and when the pop-up hood system operates, the slider moves rearward of the rail.

10. The hood retraction structure according to claim 8, wherein the slider and the rail move relative to each other in the longitudinal direction at a pair of slide portions which are spaced apart from each other in a vehicle width direction,
   the rail includes a convex portion that protrudes downward between the pair of slide portions, and
   the upper portion of the striker body is fastened to the convex portion.

11. The hood retraction structure according to claim 8, wherein the convex portion is provided on a rail plate provided between the pair of slide portions, and
   the rail plate includes a rail stepped portion provided on each of both sides in a vehicle width direction, the rail stepped portion extending upward to connect to an upper end of each of the pair of slide portions.

12. The hood retraction structure according to claim 8, wherein the rail includes a stopper portion that is provided at a rear portion of the rail and regulates retraction of the slider, and
   the stopper portion is continuously provided via a folded portionfrom the rail.

13. The hood retraction structure according to claim 12, wherein the rail includes a decelerator that is provided at the rear portion of the rail and reduce a retraction speed of the slider.

14. A hood retraction structure that allows a hood to retract relative to a hood locking mechanism when a pop-up hood system operates, the hood retraction structure comprising:
   a slider provided at a front side lower portion of the hood; and
   a rail that is provided on an upper portion of a striker body constituting the hood locking mechanism, is movable in a longitudinal direction relative to the slider, and is longer than the slider in a length in the longitudinal direction,
   wherein a retraction of the slider relative to the rail allows the hood to retract relative to the hood locking mechanism,
   wherein the slider has a notch having an opening end provided by being cut in a concave shape from a vehicle front side toward a vehicle rear side, and the notch constitutes the hood locking mechanism, and is provided at a position corresponding to an upper portion of a secondary lever that regulates upward movement of the striker body, and
   the rail includes an opening having a closed cross section, and the opening is provided at a position corresponding to an upper portion of the secondary lever.

15. The hood retraction structure according to claim 14, wherein, before the pop-up hood system operates, the slider is positioned on a front end side of the rail, and when the pop-up hood system operates, the slider moves rearward of the rail.

16. The hood retraction structure according to claim 14, wherein the slider and the rail move relative to each other in the longitudinal direction at a pair of slide portions which are spaced apart from each other in a vehicle width direction,
   the rail includes a convex portion that protrudes downward between the pair of slide portions, and
   the upper portion of the striker body is fastened to the convex portion.

17. The hood retraction structure according to claim 16, wherein the convex portion is provided on a rail plate provided between the pair of slide portions, and
   the rail plate includes a rail stepped portion provided on each of both sides in a vehicle width direction, the rail stepped portion extending upward to connect to an upper end of each of the pair of slide portions.

18. The hood retraction structure according to claim 14, wherein the rail includes a stopper portion that is provided at a rear portion of the rail and regulates retraction of the slider, and
   the stopper portion is continuously provided via a folded portion from the rail.

* * * * *